(12) United States Patent
Fox et al.

(10) Patent No.: US 11,280,990 B2
(45) Date of Patent: Mar. 22, 2022

(54) SYSTEM AND METHOD FOR MACROSCOPIC AND MICROSCOPIC IMAGING EX-VIVO TISSUE

(71) Applicant: CALIBER IMAGING & DIAGNOSTICS, INC., Rochester, NY (US)

(72) Inventors: William J. Fox, Rochester, NY (US); Christopher C. Distasio, Rochester, NY (US); Allison L. Cramb, Rochester, NY (US); Paul Hemmer, Rochester, NY (US); Christopher E. Wagner, Webster, NY (US); Keith A. Hadley, Rochester, NY (US); Elizabeth Kiefer, Rochester, NY (US)

(73) Assignee: CALIBER IMAGING & DIAGNOSTICS, INC., Rochester, NY (US)

( * ) Notice: Subject to any disclaimer, the term of this patent is extended or adjusted under 35 U.S.C. 154(b) by 0 days.

(21) Appl. No.: 16/286,576

(22) Filed: Feb. 26, 2019

(65) Prior Publication Data
US 2019/0265456 A1    Aug. 29, 2019

Related U.S. Application Data

(60) Provisional application No. 62/635,530, filed on Feb. 26, 2018.

(51) Int. Cl.
*G02B 21/26* (2006.01)
*G02B 21/00* (2006.01)
(Continued)

(52) U.S. Cl.
CPC ......... *G02B 21/0052* (2013.01); *G02B 21/24* (2013.01); *G02B 21/26* (2013.01);
(Continued)

(58) Field of Classification Search
CPC .... G06B 21/0052; G06B 21/26; G06B 21/34; G06B 21/365; G06B 21/367; G06B 21/24
See application file for complete search history.

(56) References Cited

U.S. PATENT DOCUMENTS

| | | |
|---|---|---|
| 3,551,023 A | 12/1970 | Brackett |
| 3,879,106 A | 4/1975 | McCormick |

(Continued)

FOREIGN PATENT DOCUMENTS

| | | |
|---|---|---|
| DE | 102016110988 A1 | 12/2017 |
| EP | 1804107 A1 | 7/2007 |

(Continued)

OTHER PUBLICATIONS

Schmitt et al., Optical Characterization of Dense Tissues Using Low-coherence Interferometry, Proc. of SPIE, vol. 1889, pp. 197-211, Jul. 1993.

(Continued)

*Primary Examiner* — Nasser M Goodarzi
*Assistant Examiner* — Patrick A Ryan
(74) *Attorney, Agent, or Firm* — Kenneth J. Lukacher Law Group; Kenneth J. LuKacher

(57) ABSTRACT

A system having a macroscopic imager, a microscopic imager, and a stage for moving a substrate supporting ex-vivo tissue with respect to each of the imagers to enable the macroscopic imager to capture macroscopic images, and the microscopic imager to capture optically formed sectional microscopic images on or within the tissue, when presented to the tissue, via the optically transparent material of the substrate. A computer system controls movement of the stage, and receives the macroscopic and microscopic images. A display is provided for displaying the macroscopic and microscopic images when received by the computer system. The tissue is verified as being in an orientation (Continued)

at least substantially flush against the upper surface of the substrate by being in focus in displayed macroscopic images prior to imaging by the microscopic imager, and if needed, any portion of the tissue unfocused is manually positioned until desired tissue orientation is achieved.

27 Claims, 20 Drawing Sheets

(51) Int. Cl.
*G02B 21/24* (2006.01)
*G02B 21/36* (2006.01)
*G02B 21/34* (2006.01)

(52) U.S. Cl.
CPC .......... *G02B 21/34* (2013.01); *G02B 21/365* (2013.01); *G02B 21/367* (2013.01)

(56) References Cited

U.S. PATENT DOCUMENTS

| | | | |
|---|---|---|---|
| 4,752,347 A | 6/1988 | Rada | |
| 4,836,667 A | 6/1989 | Ozeki | |
| 5,005,126 A | 4/1991 | Haskin | |
| 5,034,613 A | 7/1991 | Denk et al. | |
| 5,073,857 A | 12/1991 | Peters et al. | |
| RE34,214 E | 4/1993 | Carlsson et al. | |
| 5,235,510 A | 8/1993 | Yamada et al. | |
| 5,260,569 A | 11/1993 | Kimura | |
| 5,381,224 A | 1/1995 | Dixon et al. | |
| 5,473,706 A | 12/1995 | Bacus et al. | |
| 5,532,873 A | 7/1996 | Dixon | |
| 5,532,874 A | 7/1996 | Stein | |
| 5,548,661 A | 8/1996 | Price et al. | |
| 5,602,674 A | 2/1997 | Weissman et al. | |
| 5,655,029 A | 8/1997 | Rutenberg et al. | |
| 5,719,700 A | 2/1998 | Corcuff et al. | |
| 5,737,121 A | 4/1998 | Dixon | |
| 5,760,951 A | 6/1998 | Dixon et al. | |
| 5,788,639 A | 8/1998 | Zavislan et al. | |
| 5,836,872 A | 11/1998 | Kenet et al. | |
| 5,836,877 A | 11/1998 | Zavislan | |
| 5,851,181 A | 12/1998 | Talmor | |
| 5,859,934 A | 1/1999 | Green | |
| 5,880,880 A | 3/1999 | Anderson et al. | |
| 5,995,283 A | 11/1999 | Anderson et al. | |
| 5,995,867 A | 11/1999 | Zavislan et al. | |
| 6,002,476 A | 12/1999 | Treado | |
| 6,078,681 A | 6/2000 | Silver | |
| 6,099,522 A | 8/2000 | Knopp et al. | |
| 6,137,628 A | 10/2000 | Kraft et al. | |
| 6,151,127 A | 11/2000 | Kempe | |
| 6,208,374 B1 | 3/2001 | Clinch | |
| 6,272,235 B1 | 8/2001 | Bacus et al. | |
| 6,320,979 B1* | 11/2001 | Melen | G02B 21/367 382/154 |
| 6,330,106 B1 | 12/2001 | Greenwald et al. | |
| 6,396,941 B1* | 5/2002 | Bacus | G01N 1/312 382/128 |
| 6,411,434 B1 | 6/2002 | Eastman et al. | |
| 6,493,460 B1 | 12/2002 | Macaulay et al. | |
| 6,684,092 B2 | 1/2004 | Zavislan | |
| 6,711,283 B1* | 3/2004 | Soenksen | G02B 21/002 382/133 |
| 6,718,053 B1* | 4/2004 | Ellis | G01N 15/1475 345/604 |
| 7,155,049 B2 | 12/2006 | Wetzel et al. | |
| 7,194,118 B1 | 3/2007 | Harris et al. | |
| 7,227,630 B1 | 6/2007 | Zavislan et al. | |
| 7,359,548 B2* | 4/2008 | Douglass | G01N 1/312 345/604 |
| 7,394,592 B2 | 7/2008 | Fox et al. | |
| 7,627,153 B2* | 12/2009 | Perz | G03B 5/00 382/128 |
| 7,711,410 B2 | 5/2010 | Zavislan et al. | |
| 7,864,996 B2 | 1/2011 | Hemmer et al. | |
| 8,463,741 B2* | 6/2013 | Ehlke | G16H 15/00 707/608 |
| 8,542,274 B2* | 9/2013 | Kawano | G02B 21/365 348/79 |
| 9,055,867 B2 | 6/2015 | Fox et al. | |
| 9,229,210 B2 | 1/2016 | Fox et al. | |
| D771,169 S | 11/2016 | Weber | |
| D784,433 S | 4/2017 | Weber | |
| 9,709,791 B2 | 7/2017 | Hemmer | |
| 9,772,486 B2 | 9/2017 | Eastman et al. | |
| D812,665 S | 3/2018 | Klein et al. | |
| 10,139,613 B2* | 11/2018 | Hing | G02B 21/367 |
| 2004/0133112 A1 | 7/2004 | Rajadhyaksha | |
| 2006/0274407 A1* | 12/2006 | Fox | G02B 21/0028 359/384 |
| 2007/0160279 A1 | 7/2007 | Demos | |
| 2007/0206275 A1* | 9/2007 | Hemmer | G02B 21/0024 359/385 |
| 2008/0151368 A1 | 6/2008 | Weiss | |
| 2009/0185035 A1* | 7/2009 | Shirota | G02B 21/365 348/79 |
| 2010/0208052 A1* | 8/2010 | Sase | G02B 21/365 348/79 |
| 2011/0249327 A1 | 10/2011 | Yamamoto et al. | |
| 2014/0042478 A1* | 2/2014 | Hirono | H01L 31/02325 257/98 |
| 2014/0049632 A1* | 2/2014 | Hemmer | G02B 21/008 348/79 |
| 2014/0065656 A1* | 3/2014 | Baysal | G01N 1/31 435/29 |
| 2016/0231552 A1 | 8/2016 | Hein | |
| 2016/0367992 A1* | 12/2016 | Purdy | A61B 10/0096 |
| 2017/0139195 A1* | 5/2017 | Kennedy | G02B 21/12 |
| 2018/0129031 A1 | 5/2018 | Hadley et al. | |
| 2018/0136448 A1 | 5/2018 | Cramb et al. | |
| 2018/0307019 A1* | 10/2018 | Dixon | G02B 21/365 |
| 2019/0072463 A1* | 3/2019 | O'Driscoll | B01L 3/508 |

FOREIGN PATENT DOCUMENTS

EP           1830216 A1    9/2007
WO      WO2014/085911        6/2014

OTHER PUBLICATIONS

Rajadhyaksha et al., In Vivo Confocal Scanning Laser Microscopy of Human Skin: Melanin Provides Strong Contrast, Journal of Investigative Dermatology, vol. 104, No. 6, pp. 946-952, Jun. 1995.
Rajadhyaksha et al., Confocal Laser Microscope Images Tissue in vivo, Laser Focus World, pp. 119-127, Feb. 1997.
VivaScope(R) 2500 Multilaser, MAVIG GmbH, 2010.
Vivascope(R), MAVIG GmbH, 2011.
VivaScope(R) 1500/3000, MAVIG GmbH, 2011.
Scanning Stage SCANplus IM, Marzhauser Wetzlar GmbH & Co. KG, Mar. 2016.
Supplementary Partial European Search Report with Annex for European Patent Application No. EP19757944.4, Date Completed Oct. 14, 2021, dated Oct. 25, 2021, dated Nov. 19, 2021.
Provisional Opinion Accompanying the Partial Search Result for European Patent Application No. EP19757944.4, dated Oct. 25, 2021, dated Nov. 19, 2021.

* cited by examiner

SYSTEM AND METHOD FOR MACROSCOPIC AND MICROSCOPIC IMAGING EX-VIVO TISSUE

This application claims priority to U.S. Provisional Patent Application No. 62/635,530, filed Feb. 26, 2018, which is incorporated herein by reference.

FIELD OF THE INVENTION

The present invention relates to a system and method for macroscopic and microscopic imaging ex-vivo tissue, and particularly to, a system having macroscopic and microscopic imagers mounted in a common housing for imaging an ex-vivo tissue sample with a movable stage to present the tissue sample to each of the imagers, and a method by which an ex-vivo tissue sample is presented to such imagers to carry out imaging of the ex-vivo tissue sample. The tissue sample is supported on a substrate presented by the stage to each of the macroscopic and microscopic imagers for capturing images of the tissue sample via optically transparent material of the substrate. As it is important that areas of interest of the ex-vivo tissue sample to be imaged by the microscopic imager lie flat or substantially flush against the substrate which supports the tissue sample, the present invention is particularly useful to verify that the tissue sample lies in such orientation using displayed images from the macroscopic imager prior to imaging by the microscopic imager, and if needed, manual reorienting any portion of the tissue sample with respect to the substrate until desired tissue sample orientation is achieved. While the microscopic imager is preferably a confocal microscope providing optically sectioned microscopic images of the tissue, and at different depths within the tissue, other microscopic imagers enabling optically sectioned images of tissue may also be used.

BACKGROUND OF THE INVENTION

In Mohs micrographic surgery, tissue having a tumor, typically a carcinoma on the skin of the head or neck, is excised from a patient under microscopic guidance. The excised tissue specimen, often called a biopsy, is horizontally sliced to provide thin tissue sections that are then histologically prepared on slides (i.e., slicing, slide mounting, and staining). The slides are reviewed under a microscope to determine whether the tumor is fully contained in the excised tissue. This is indicated by the absence of the tumor in the edges or margins of the excised tissue. If the tumor is not fully contained in the excised tissue, additional tissue from the patient is excised and the procedure is repeated until all tissue sections taken indicate the tumor has been removed from the patient. Mohs surgery permits removal of a tumor with maximum preservation of normal surrounding tissue.

To prepare each ex-vivo tissue specimen removed by the patient during Mohs surgery, multiple sections or slices are manually made with a microtome, where each section is planar and parallel to each other. Often the tissue specimen is first frozen to make the tissue easier to manipulate and cut by the microtome. However, since numerous sections must be made from each tissue specimen and then histologically prepared on slides, this procedure is both tedious and time consuming.

Confocal microscopes optically section tissue to produce microscopic images of tissue sections without requiring such histological preparation of the tissue on slides. An example of a confocal microscope is the VivaScope® manufactured by Caliber Imaging Diagnostics, Inc. of Rochester, N.Y., U.S.A. Other examples of confocal microscopes are described in U.S. Pat. Nos. 5,788,639, 5,880,880, 7,394,592, and 9,055,867. Optically sectioned microscopic images of tissue can also be produced by optical coherence tomography or interferometry, such as described in Schmitt et al., "Optical characterization of disease tissues using low-coherence interferometry," Proc. of SPIE, Volume 1889 (1993), or by a two-photon laser microscope, such as described in U.S. Pat. No. 5,034,613.

One problem with optical sectioning an ex-vivo tissue sample is that tissue often does not lie flat upon a substrate of optically transparent material, e.g., glass or plastic, through which images of the tissue specimen can be captured, such as due to folding of the tissue, or air bubbles trapped between the tissue and substrate. This problem is exacerbated when the tissue sample is thick, such as 2-3 mm, such that side edges containing possible tissue margins do not lie flat upon the substrate for microscopic imaging. To overcome this problem, a cassette is described in U.S. Pat. No. 6,411,434 having a base member with a rigid optically transparent planar window upon which a tissue specimen is situated, and a pliable plastic membrane locatable over the window and a substantial portion of the base member through which the tissue specimen can be manually reoriented. Although useful, it needs a skilled technician using a probe to reorient the tissue under the membrane to a desired position without puncturing the membrane. This is a delicate procedure which if not performed properly can damage the tissue specimen. Moreover, it has been found that despite training, technicians have had difficulty determining where to manipulate tissue, and can inadvertently damage tissue by applying more pressure with the probe than needed, or manipulate tissue already sufficiently planar against the substrate for optical sectioning.

An additional problem is that even once a specimen visually appears to a trained technician to be properly oriented, one cannot readily verify that the tissue specimen is properly oriented against the substrate, or if manipulated that such manipulation succeeded, so that the portions of interest of the tissue can be fully presented to the confocal microscope by being substantially flush against the substrate through which imaging is carried out. This is important so that margins along the tissue are not missed when determining healthy from abnormal tissue (e.g., cells) associated with the tumor (or a lesion) being removed. While U.S. Pat. No. 6,411,434 further describes a camera for capturing a macroscopic image of a tissue specimen once oriented in a cassette, such camera is not positioned to image the tissue via the same substrate as the confocal imager that images the tissue. Thus, it would be desirable to both verify that the ex-vivo tissue is sufficiently in a flush or flat orientation against a substrate using images from a macroscopic camera, and to identify and reorient any portion of the tissue of interest that is not lying in such desired orientation against the substrate for proper imaging by the confocal microscope.

U.S. Pat. No. 7,864,996 describes a system for macroscopic and confocal imaging of in-vivo tissue having a macroscopic imager for capturing a macroscopic image of the tissue's surface for tissue, and a confocal imager for capturing one or more optically formed sectional microscopic images on or within tissue. This system is for imaging in-vivo tissue of a patient, such as skin, and uses a tissue attachment device onto a patient into which the macroscopic imager and confocal imager are each separately received. While useful, the tissue attachment is not designed for use with a specimen of ex-vivo tissue which may be excised from a patient and placed on a substrate. U.S. Pat. Nos. 5,836,877 and 6,684,092 describe a system having digital camera and a confocal imager directed to imaging tissue along the surface of the body of a patient. Like U.S. Pat. No. 7,864,996, the systems of U.S. Pat. Nos. 5,836,877 and 6,684,092 are also designed for imaging in-vivo, rather than ex-vivo tissue, which may be excised from a patient and placed on a substrate for optical sectional imaging.

SUMMARY OF THE INVENTION

Accordingly, it is an object of the present invention to provide a system and method for macroscopic and microscopic imaging of ex-vivo tissue where images from a macroscopic imager can be used to provide tissue orientation verification for imaging by the microscopic imager.

It is a further object of the present invention to provide a system and method for macroscopic and microscopic imaging of ex-vivo tissue where prior to microscopic imaging, the tissue is verified as being in an orientation at least substantially flush against a surface of the substrate by being in focus in displayed macroscopic images prior to imaging by the microscopic imager, and if needed, any portion of the tissue unfocused is manually positioned until desired tissue sample orientation is achieved.

It is still a further object of the present invention to provide a system for macroscopic and microscopic imaging of ex-vivo tissue where macroscopic and microscopic imagers are each mounted in a common housing along with a stage for moving the tissue with respect to the imagers.

Briefly described, the present invention embodies a system having a macroscopic imager, a microscopic imager, and a stage for moving a substrate having optically transparent material supporting ex-vivo tissue with respect to each of the macroscopic imager and the microscopic imager to enable the macroscopic imager to capture one or more macroscopic images, and the microscopic imager to capture one or more optically formed sectional microscopic images on or within the ex-vivo tissue, when presented to the ex-vivo tissue, via the optically transparent material of the substrate. A computer system controls movement of the stage with respect to the macroscopic imager and the microscopic imager, and receives the one or more macroscopic images, and the one or more microscopic images. A display is provided for displaying the macroscopic images and microscopic images when received by the computer system.

Preferably, a housing contains at least the macroscopic imager, the microscopic imager, and the stage. Such housing has a cover for blocking ambient light when at least microscopic images are captured by the microscopic imager.

The stage moves the ex-vivo tissue disposed upon the substrate along x and y orthogonal axes. Optics of the macroscopic imager for imaging the ex-vivo tissue, and at least an objective lens of optics of the microscopic imager for imaging the ex-vivo tissue, each have an optical axis oriented to extend at least approximately parallel with a z axis orthogonal to the x and y orthogonal axes. The imagers are each in a different assembly fixed in position in the housing with respect to the stage in accordance with the x, y, and z orthogonal axes prior to the ex-vivo tissue being presented to the imagers.

The macroscopic images and microscopic images are each two-dimensional images spatially aligned with the x and y orthogonal axes of the stage. Thus, one of the macroscopic images of the ex-vivo tissue specimen captured may be presented on the display and used to guide the selection of one or more locations for capture of microscopic images by the microscopic imager. This may be facilitated by overlaying one or more graphical elements upon such macroscopic image indicating a location of imaging by said microscopic imager with respect to said ex-vivo tissue displayed, and preferably microscopic imager's field of view relative to the ex-vivo tissue.

The computer system captures macroscopic images from the macroscopic imager prior to the stage moving the ex-vivo tissue sample for imaging by the microscopic imager. During imaging by the macroscopic imager, macroscopic images of the ex-vivo tissue are displayed to verify that the tissue lies at least substantially flush or flat against the upper surface of the substrate by being in focus in such images, and any portion of the tissue specimen appearing unfocused in the microscopic images on the display is manipulated upon the substrate until disposed against the substrate by being in focus in macroscopic images prior to the stage moving the tissue sample for imaging by the microscopic imager. This avoids the problem of having tissue areas lying in an orientation that are not sufficiently planar and hence not available for proper imaging by the microscopic imager. The manipulation of the tissue specimen may be carried out with the use of an external tool to manually position unfocused parts of the tissue by an operator until such parts are displayed in focus when imaged by the macroscopic imager.

The microscopic imager is preferably a confocal microscope. One advantage of the present invention over prior art for confocal microscopic imaging of ex-vivo tissue samples is that use of macroscopic images for verification of the tissue sample orientation assures that portions or areas of the ex-vivo tissue sample, particularly the outer edges which may be non-planar to a substrate when first present thereto, or portions of the tissue folded over each other or have air bubbles, are properly oriented for imaging, and if needed manipulated to a proper orientation, against a substrate supporting the tissue specimen before the tissue sample is imaged by the confocal microscope via the substrate.

After verification (and manipulation if needed) of tissue sample orientation, a cover substrate, device, or member may be applied and retained over the substrate providing a supporting base for the ex-vivo tissue sample to retain such tissue sample orientation when microscopically imaged. The cover substrate may optionally be so placed before the verification of tissue sample orientation using macroscopic images. If the cover substrate is placed before such verification, the cover substrate may need to be temporarily removed to enable access to the tissue sample for any needed manipulation as described above, and then placed back thereupon the tissue specimen and its supporting substrate. Further, the cover substrate placement can serve as the external tool, or an additional tool, by providing a downward force to manipulate the tissue specimen so that any non-planar portions move against the tissue sample supporting substrate.

The present invention also embodies a method for macroscopic and microscopic imaging ex-vivo tissue comprising the steps of: mounting in a common housing at least a macroscopic imager, a microscopic imager, and a stage; placing ex-vivo tissue on a substrate having optically transparent material; mounting the substrate on the stage, which is mounted in the housing to move the substrate with respect to each of the macroscopic imager and the microscopic imager, wherein the substrate mounting step is carried out before or after the placing step; moving the stage to present the ex-vivo tissue on the substrate to the macroscopic imager; capturing, with the macroscopic imager, one or more macroscopic images via the optically transparent material of the substrate; moving the stage to present the ex-vivo tissue to the microscopic imager; capturing, with the microscopic imager, one or more optically formed sectional microscopic images on or within the ex-vivo tissue; and displaying such one or more macroscopic images and one or more microscopic images when captured with the aid of a computer system receiving such one or more macroscopic images and one or more microscopic images.

The capturing of one or more macroscopic images may further comprise the steps of verifying the ex-vivo tissue lies at least substantially flush against a surface of the substrate by being in focus in the one or more macroscopic images, and manually positioning any portion of the ex-vivo tissue unfocused in the one or more macroscopic images on the display substantially flush against the surface of the substrate until being in focus in the one or more macroscopic images. Positioning a cover may be carried out for blocking ambient light when at least one or more microscopic images are captured.

The capturing of macroscopic images may further comprise the step of selecting one of the one or more microscopic images captured, and the displaying step displays the selected one of the microscopic images with display of the one or more microscopic images when captured, and overlays one or more graphical elements on the selected one of the one or more macroscopic images indicating a location of imaging by the microscopic imager with respect to the ex-vivo tissue displayed in the selected one of the macroscopic images to guide in selection of one or more locations of the ex-vivo tissue for imaging by the microscopic imager.

While preferably the microscopic imager is operative by confocal microscopy, other optical sectioning microscopes may be used to provide the microscopic imager, such as those operative by two-photon microscopy or optical coherence tomography (OCT).

BRIEF DESCRIPTION OF THE DRAWINGS

The foregoing features, objects, and advantages of the invention will become more apparent from a reading of the following description in connection with the accompanying drawings, in which:

FIG. 2D shows cover substrate prior to being manually positioned upon the base substrate;

DETAILED DESCRIPTION OF INVENTION

Figure 1:
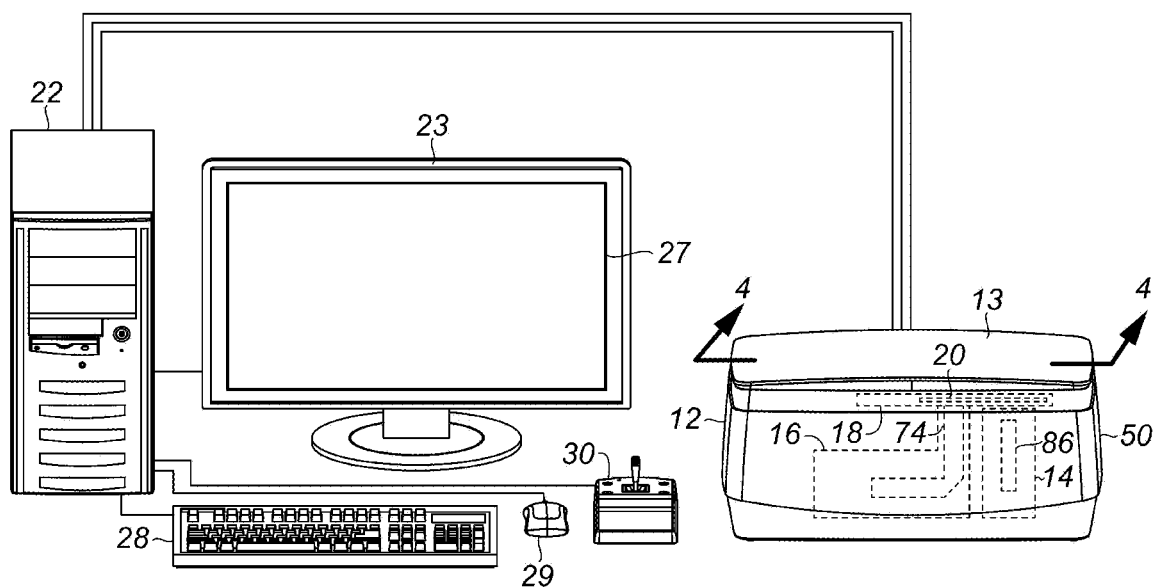
FIG. 1 is a diagram of the system of the present invention with a computer system for controlling and receiving images from macroscopic and microscopic imagers, which are mounted with a stage in a housing having a hinged cover.
Figure 1A:
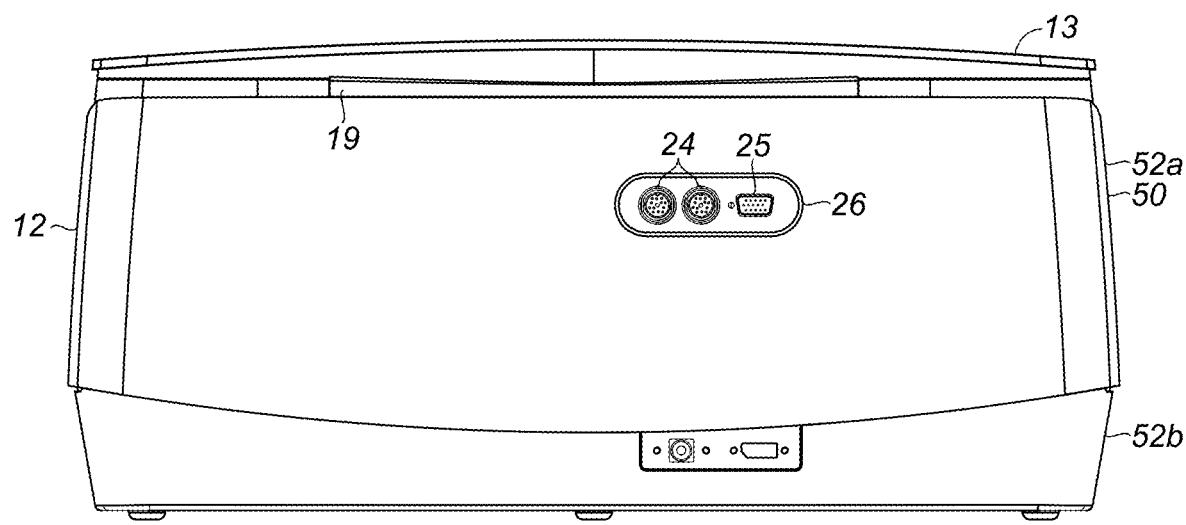
FIG. 1A is a rear view of the housing of FIG. 1 having the macroscopic and microscopic imagers and stage showing connectors in which cables to the computer system are removed.
Figure 2A:
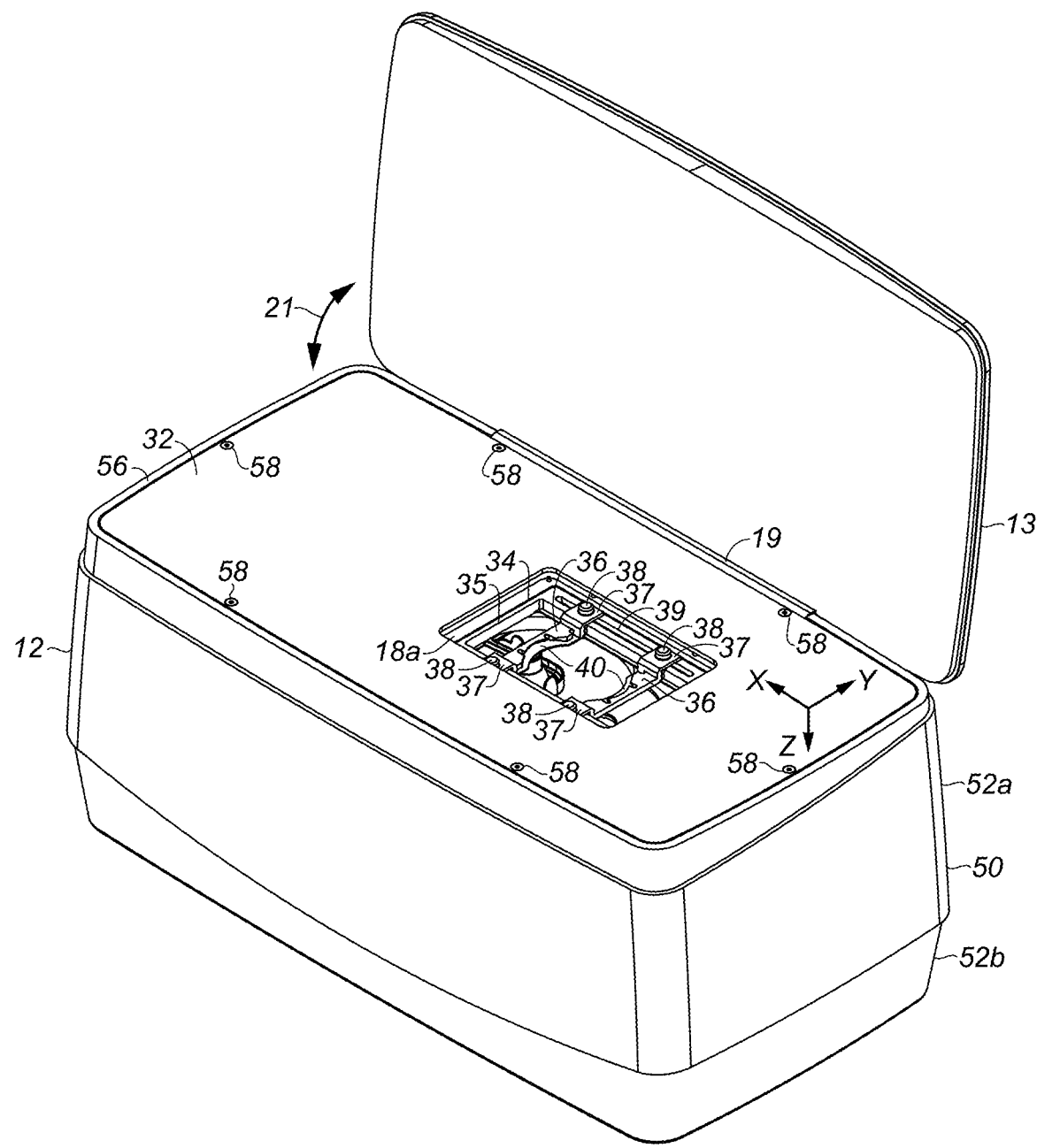
FIG. 2A is a perspective view of the housing of FIG. 1 having the macroscopic and microscopic imagers and stage showing a specimen mounting platform for the stage movable with respect to optics of each of the macroscopic and microscopic imagers in the housing, in which the cover of the housing is shown lifted to an up state.
Figure 2B:
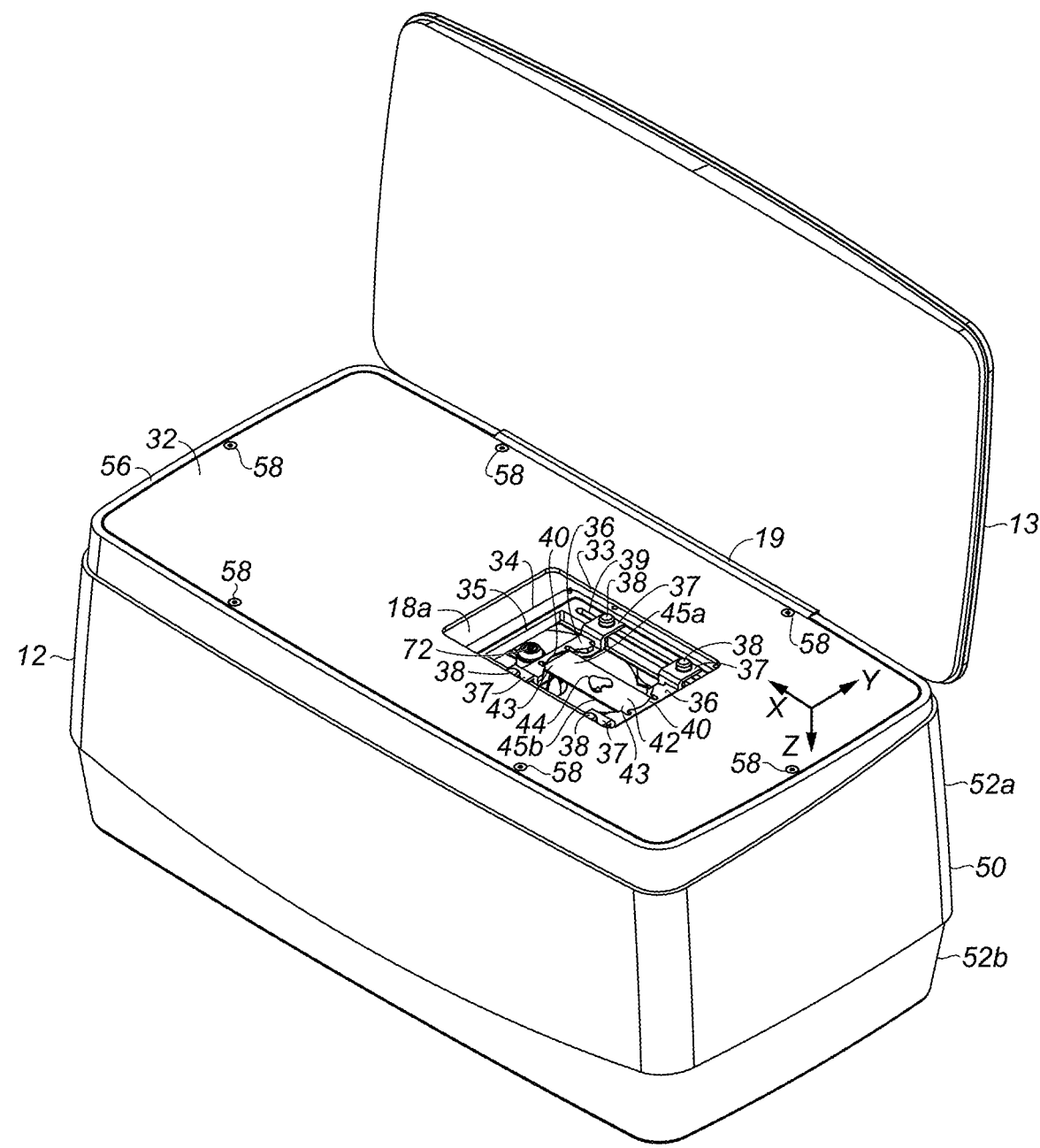
FIGS. 2B and 2C are the same perspective view of the housing of FIG. 2A showing an example of an ex-vivo tissue sample when mounted upon a substrate to the specimen mounting platform in which such stage is moved to present the tissue sample to the macroscopic imager in FIG. 2B and then to the microscopic imager in FIG. 2C.
Figure 2C:
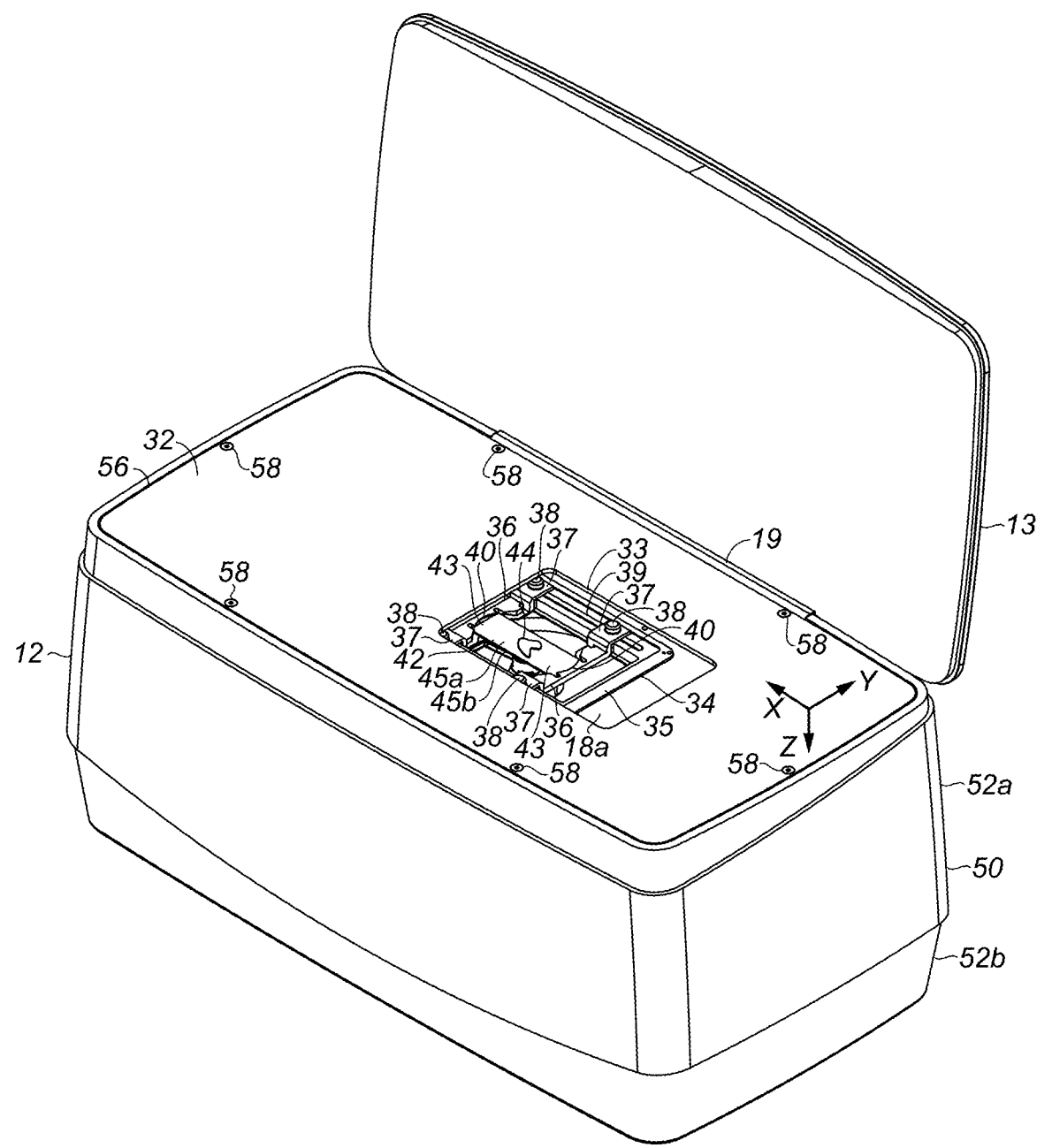

Referring to FIG. 1, a system 10 is shown having a housing 12 containing a macroscopic imager 14, a microscopic imager 16, and a stage 18, where stage 18 moves a tissue specimen mounting platform 20 with respect to imagers 14 and 16, and in particular with respect to each of their optics 86 and 74, respectively, that enable imaging. As the cover 13 of housing 12 is shown closed, macroscopic imager 14, microscopic imager 16, and stage 18 are blocked from view and shown in FIG. 1 by blocks in dashed lines. Cover 13 is connected by a hinge 19 along housing 12 for moving the cover 13 between an up or open state and a down or closed state, as denoted by arrows 21 in FIG. 2A. FIGS. 2A-C show cover 13 lifted by a user to an up or open state, and FIGS. 1 and 1A show cover 13 returned to a down or closed state.

A computer system 22, such as personal computer or workstation, communicates with each of imagers 14 and 16 via cables to ports 24 (FIG. 1A) along an opening 26 in the back of housing 12 to control the operation of imagers 14 and 16 and to receive signals representative of images from imagers 14 and 16. Images received from imagers 14 and 16 can be stored in memory (such as RAM or hard drive) of computer system 22, and outputted in either still or video formats to a display 23 connected to computer system 22. A graphical user interface is provided on the screen 27 of display 23, as will be described later in connection with FIGS. 8, 10, and 12. Computer system 22 is also connected for communication with stage 18 via a cable to a port 25 in opening 26 of housing 12 to provide signals controlling movement of stage 18, whereby such signals can be sent to x and y motors of stage 18 to move the stage along x and y orthogonal axes, respectively. User interface devices are also connected to computer system 22, such as a keyboard 28 and mouse 29, enabling a user to interact with the software or program operating on computer system 22 to control operation of stage 18, macroscopic imager 14, and microscopic imager 16. Display 23 may be a touchscreen display which provides an additional user interface device to software operating on computer system 22. An optional joystick 30 may be connected by a cable to either a port on the computer system 22, or stage 18, to move stage 18 by providing signals to control x and/or y motors of the stage 18 responsive to movement of the joystick by a user.

Referring to FIGS. 2A-E, and 3A-B, housing 12 is a generally rectangular container having a top or upper wall 32 with a rectangular opening 33 for accessing specimen mounting platform 20. Specimen mounting platform 20 is insert-mounted in an opening 34 along the upper portion 18a of stage 18, as best shown in the exploded views of FIGS. 3A and 3B. Specimen mounting platform 20 has a rectangular aperture or opening 35 having sides extending parallel to the x and y axes. Two arms 36 extend parallel to the y axis across aperture 35. Each of the arms 36 has two opposing ends 37 with mounting pins 38, via holes in such ends, received in two slots 39 in the platform 20 that extend parallel to the x axis. Arms 36 each have inward facing recess or groove 40 shaped to receive one of opposing ends 43 of a substrate 42 providing a base supporting tissue having a planar or flat upper surface 45a. The example of substrate 42 shown is of a typical plastic or glass slide as used with optical microscopes. Recesses 40 may be shaped to receive a different substrate of same or different size or thickness, or a specimen holder or cassette, such as described in U.S. Pat. No. 6,411,434, or other device for holding a tissue sample. The specimen mounting platform 20 without substrate 42 is shown in FIG. 2A, and with substrate 42 in FIGS. 2B and 2C with an example of an ex-vivo tissue sample or specimen 44 mounted thereupon the upper surface 45a of substrate 42. Ex-vivo tissue sample 44 may be non-histologically prepared tissue removed from a patient/subject, such as from Mohs surgery, or other ex-vivo tissue excised or otherwise acquired from a human or animal. Thus, the tissue specimen shown in the figures is illustrative as the tissue specimen may be of different shape, size, or thickness.

Figure 2D:
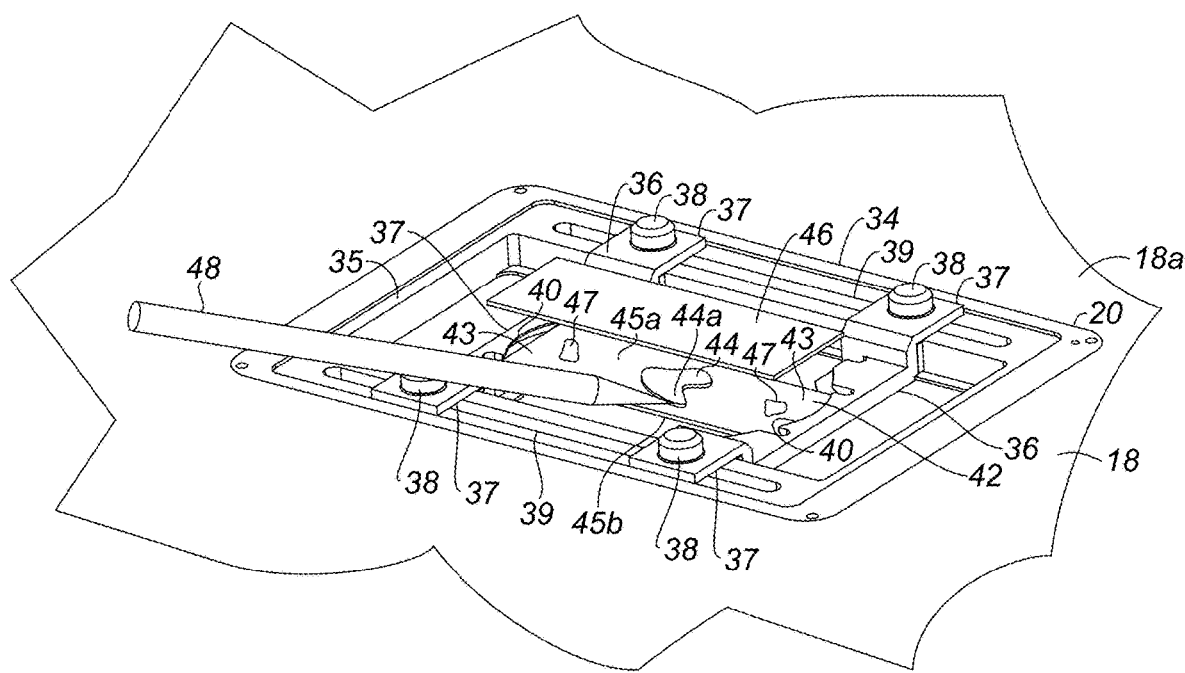
FIGS. 2D and 2E are broken perspective views of the specimen mounting platform of FIGS. 2A and 2B with the upper wall of the housing removed showing before and after, respectively, placement of a cover substrate upon a base substrate supporting a tissue sample to retain the tissue sample in its desired orientation after manipulation of one or more portions to be substantially flush or flat against the base substrate, where
Figure 2E:
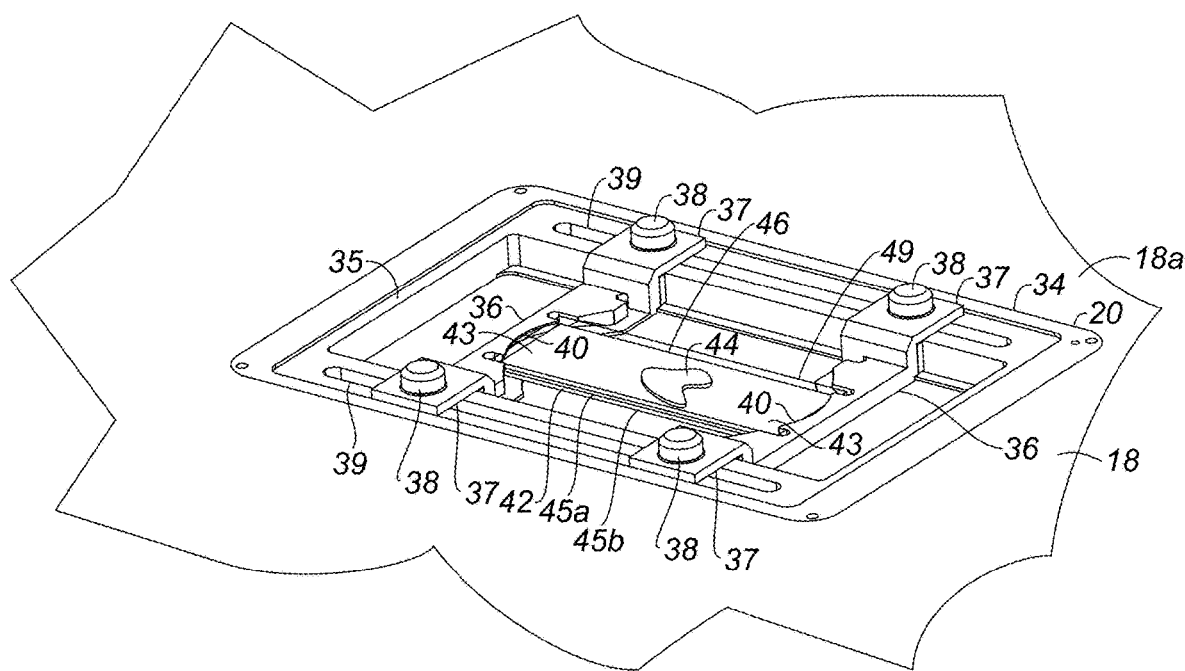

Preferably, as shown in FIGS. 2D and 2E, a cover substrate 46 is placed upon the substrate 42 providing a base supporting tissue sample 44 to apply a downward force upon the tissue sample against upper surface 45a. FIG. 2D shows cover substrate 46 prior to placement upon substrate 42, and FIG. 2E after such placement. An adhesive 47 is present between substrates 42 and 46 on opposite sides of tissue sample 44 near ends 43 of substrate 42 to retain tissue sample 44 in a desired orientation against surface 45a when imaged by microscopic imager 16. As will be described later below, a tool 48 can be used to manipulate any portion of tissue sample 44 not sufficiently planar or flush against surface 45a of substrate 42 for proper imaging by microscopic imager 16 as part of tissue sample orientation verification. While preferably such manipulation is performed before placement of substrate 46 onto substrate 42, the adhesive 47 until set allows substrate 46 to be lifted away from substrate 42 if needed to reorient any portions of the tissue sample 44, and then placed back upon substrate 42. For example, adhesive 47 may be a liquid adhesive material applied just prior to placement of substrate 46 upon substrate 42, or an optionally adhesive coating provided along one or both of upper surface 45a of substrate 42 or the bottom surface of substrate 46, to join the substrates with tissue sample 44 there between. Substrate 46 may be identical to substrate 42, but a different device or member than substrate 46 may be used to apply a downward force upon the tissue sample 44 against upper surface 45a of substrate 46. For purposes of illustration, substrate 46 is not shown in FIG. 2C.

One of arms 36 is fixed by its pins 38 in position along slots 39, while the other of arms 36 is movable along slots 39. The movable arm 36 is moved by pushing pins 38 and sliding the arm along slots 39 to adjust the distance with respect to the fixed arm 36 as needed so that the ends 43 of substrate 42 are captured or retained in recesses 40 of arms 36. Releasing pins 38 of the movable arm 36 then retains its position along aperture 35. Other mechanisms may be used along platform 20 for mounting substrate 42.

Figure 7:
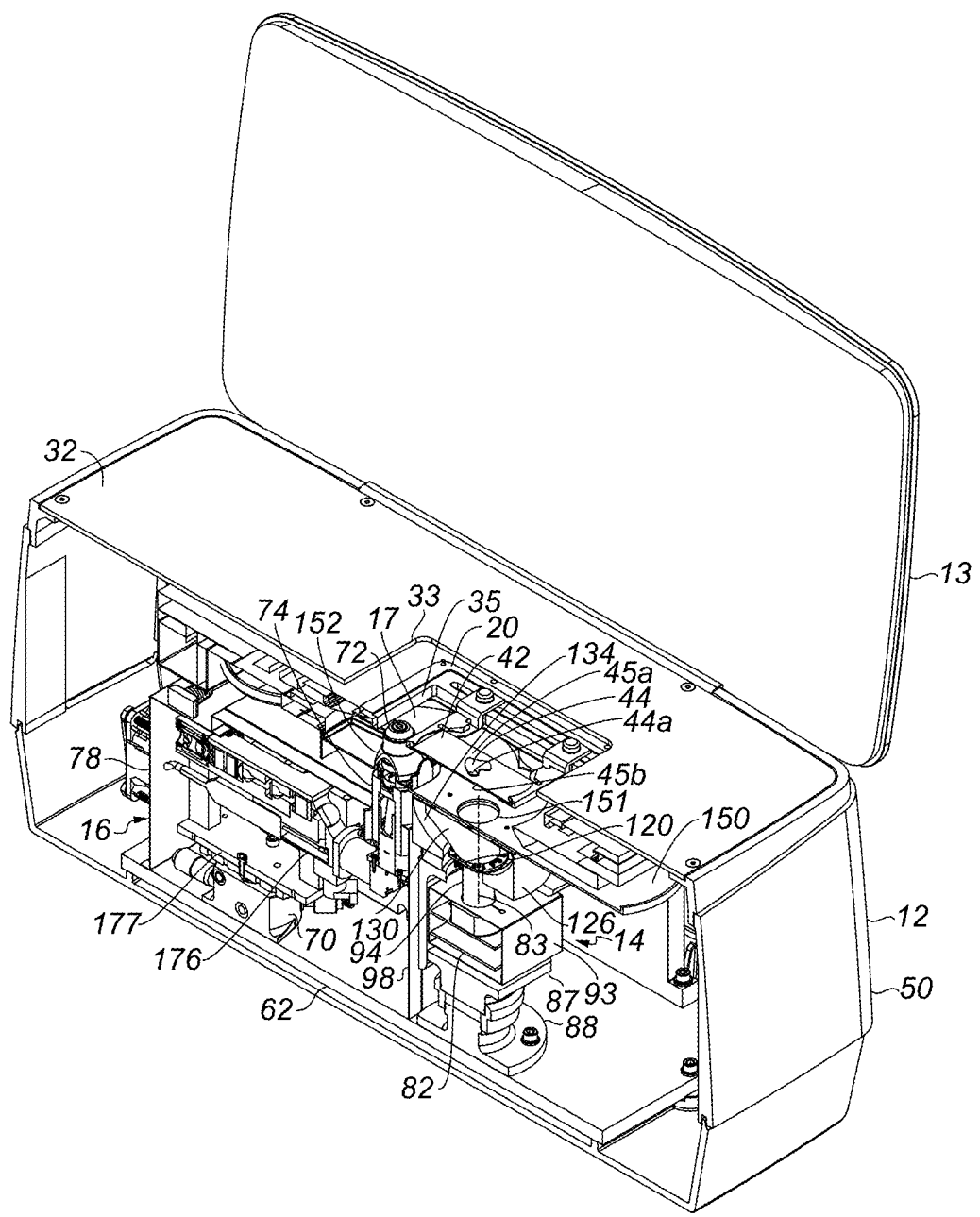
FIG. 7 is a perspective cross-sectional view of FIG. 1 along line 4-4 in FIG. 1 of the housing having the macroscopic and microscopic imagers and stage in the direction of arrows at the ends of such line showing the cover is in a lifted up state with an example of an ex-vivo tissue sample upon a substrate positioned by the stage for imaging by the macroscopic imager as shown in FIG. 2B, where the ex-vivo tissue sample can be seen having at least one portion which is not lying flat against the substrate mounted to the stage.
Figure 11:
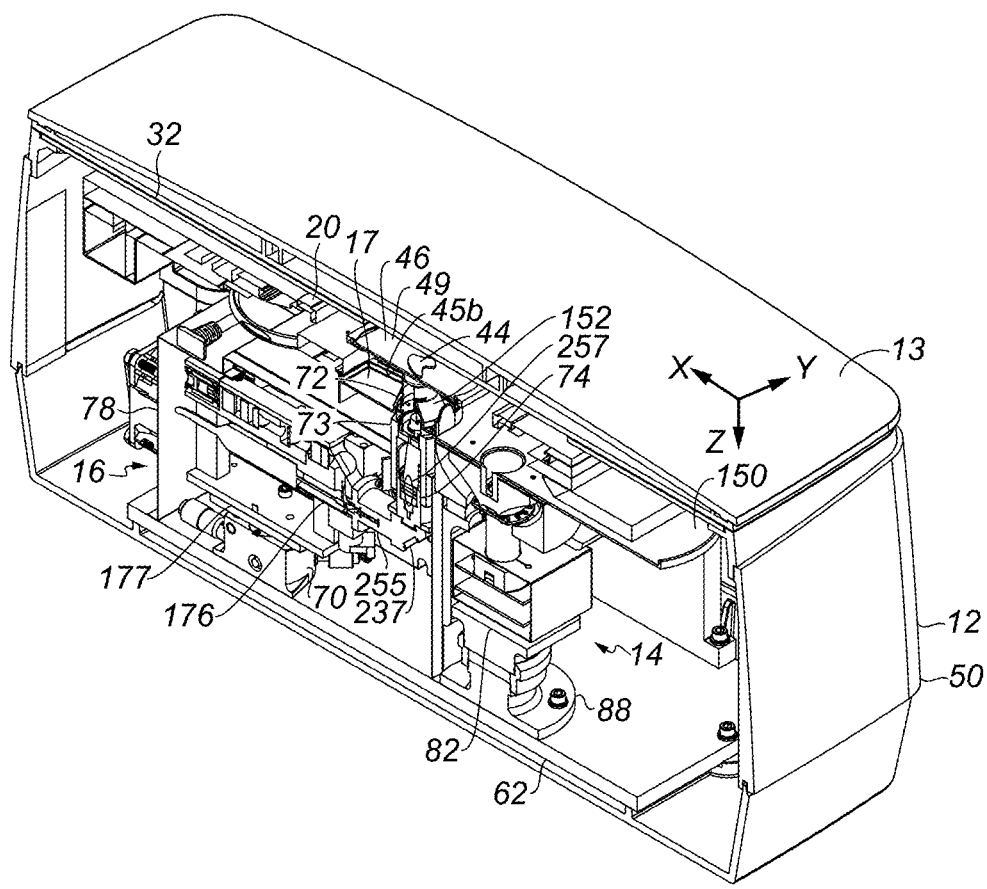
FIG. 11 is the same perspective cross-sectional view of the housing of FIGS. 7 and 9 in which the cover of the housing is placed in a down state with the same example of an ex-vivo tissue sample of FIG. 2E, which is now retained between a cover substrate and the substrate providing a base supporting the tissue sample, and positioned by the stage for imaging by the microscopic imager as shown in FIG. 2C.

Once the substrate 42 is properly mounted to the stage 18, and tissue sample 44 is placed upon substrate 42, substrate 42 is moved by stage 18, if not already in position, to first present the tissue sample 44 to optics 86 of the macroscopic imager 14 as shown in FIG. 2B for capturing one or more macroscopic images, and then substrate 42 is moved by stage 18 to present the tissue sample 44 to an objective lens 72 of optics 74 of the microscopic imager 16 as shown in FIG. 2B for capturing one or more microscopic images. When stage 18 presents tissue sample 44 upon substrate 42 to each imager 14 and 16, images are captured by the imager through the optical transparent material of the substrate 42 via both the lower bottom surface 45b and upper surface 45a of substrate 42, as shown in FIGS. 7 and 11, respectively. While preferably substrate 42 is entirely of transparent material, such as glass or plastic, only such portion upon which tissue sample 44 is disposed need be of transparent material to the illumination to imagers 14 and 16 to enable imaging through substrate 42.

Cover 13 in its down state over upper wall 32 blocks (or at least minimizes) ambient light from being received by imagers 14 and 16, respectively, when each are operated to capture images. Cover 13 is optional where system 10 is utilized in environments where the level of artificial/natural lighting can be controlled so that ambient light is minimized during operation of imagers 14 and 16.

Figure 3A:
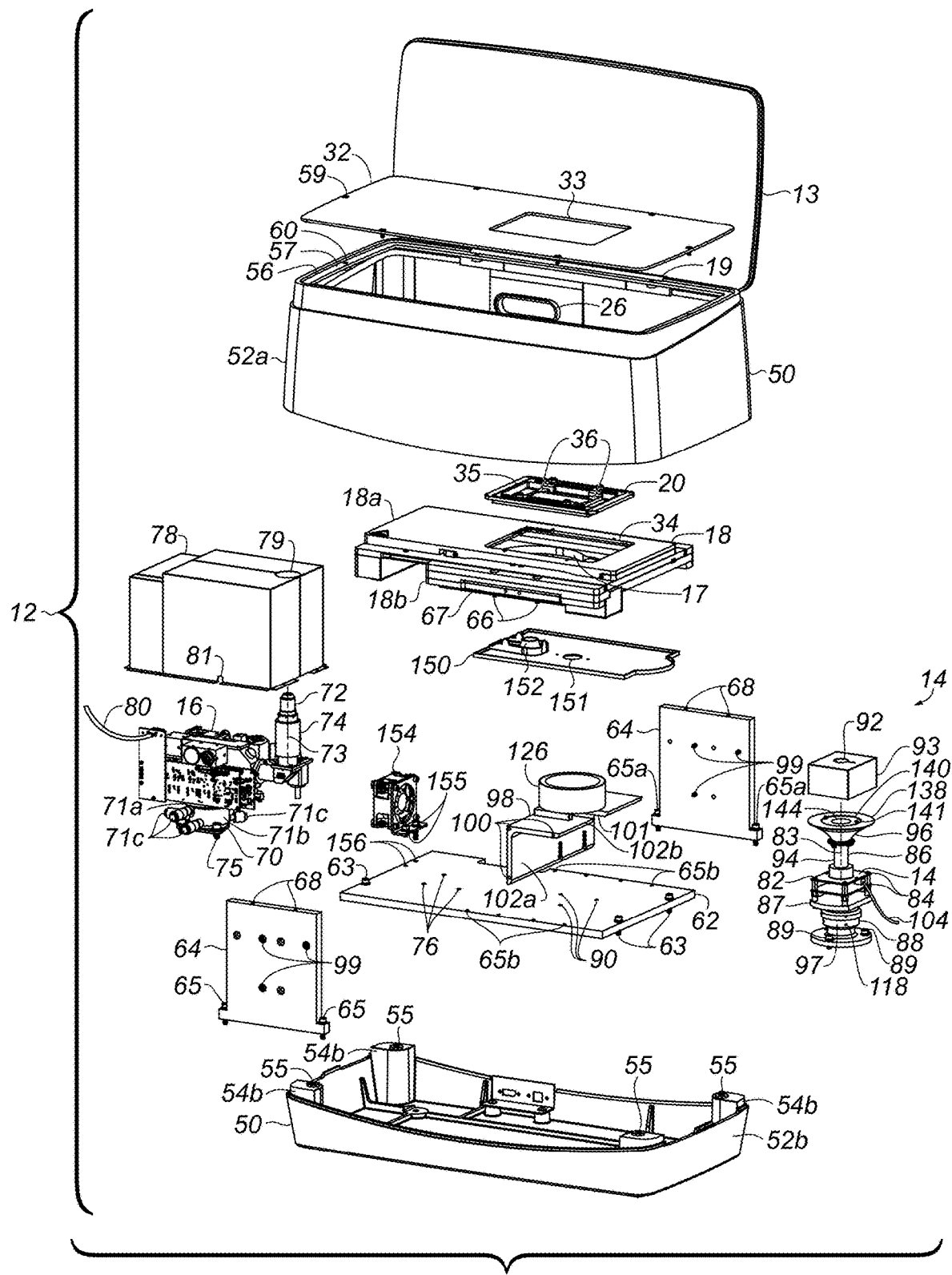
FIGS. 3A and 3B are downwardly looking front and upwardly looking bottom exploded views, respectively, of the assembly of the macroscopic and microscopic imagers, stage, and specimen mounting platform in the housing of FIG. 1, where completed assemblies of the macroscopic and microscopic imagers are shown and the cover of the housing is in a lifted up state.
Figure 3B:
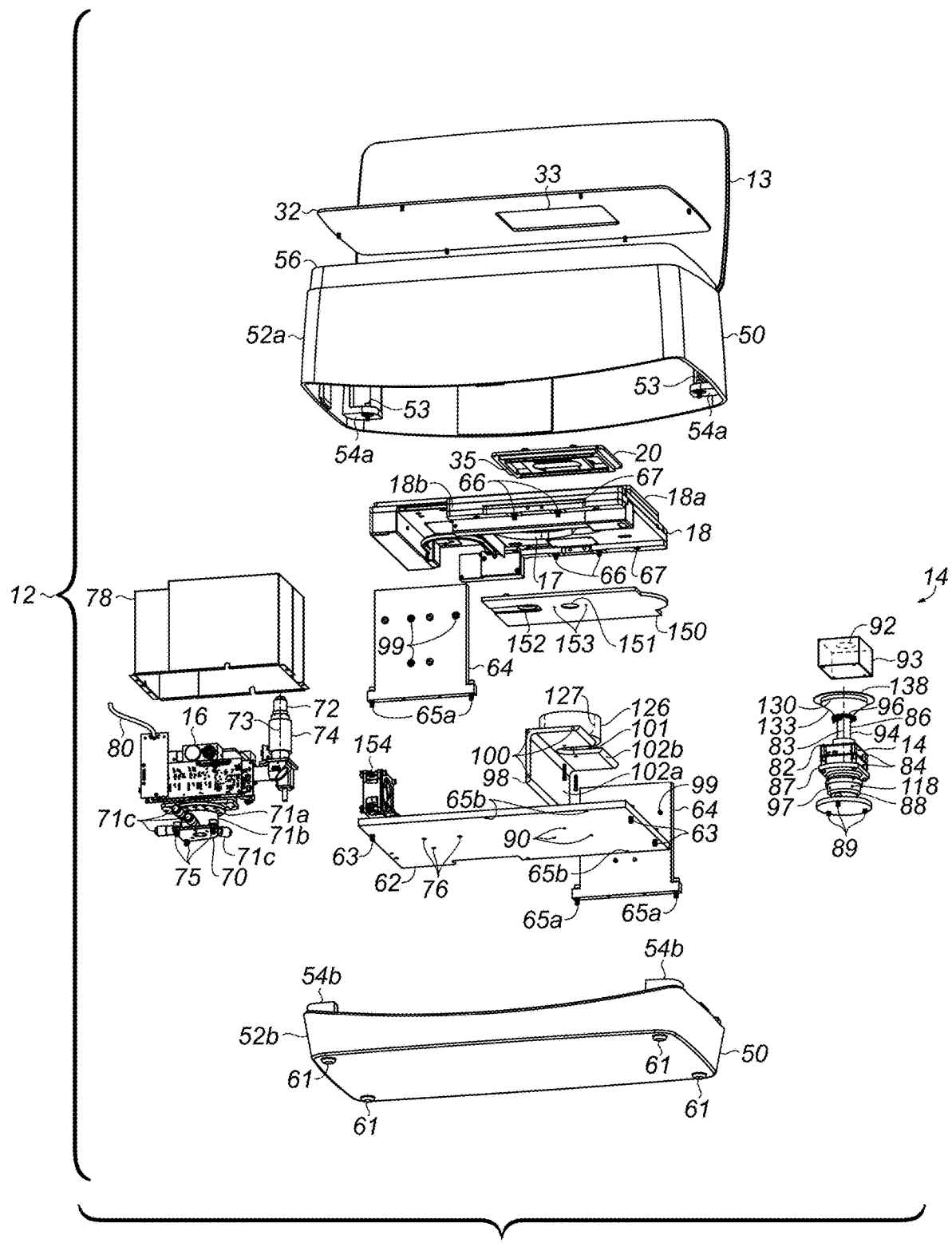
Figure 4:
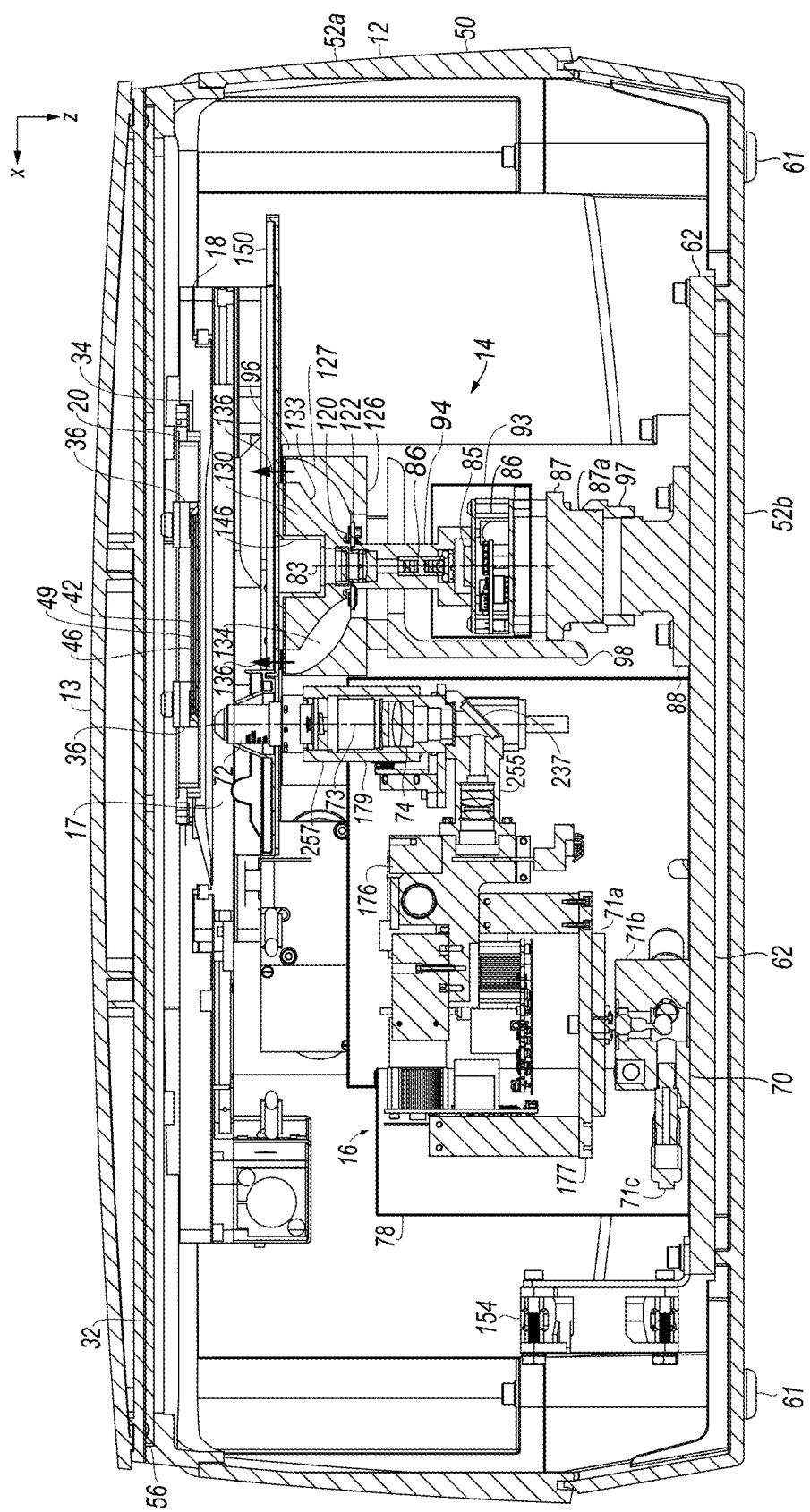
FIG. 4 is a cross-sectional view along line 4-4 in FIG. 1 of the housing having the macroscopic and microscopic imagers and stage in the direction of arrows at the ends of such line.
Figure 4A:
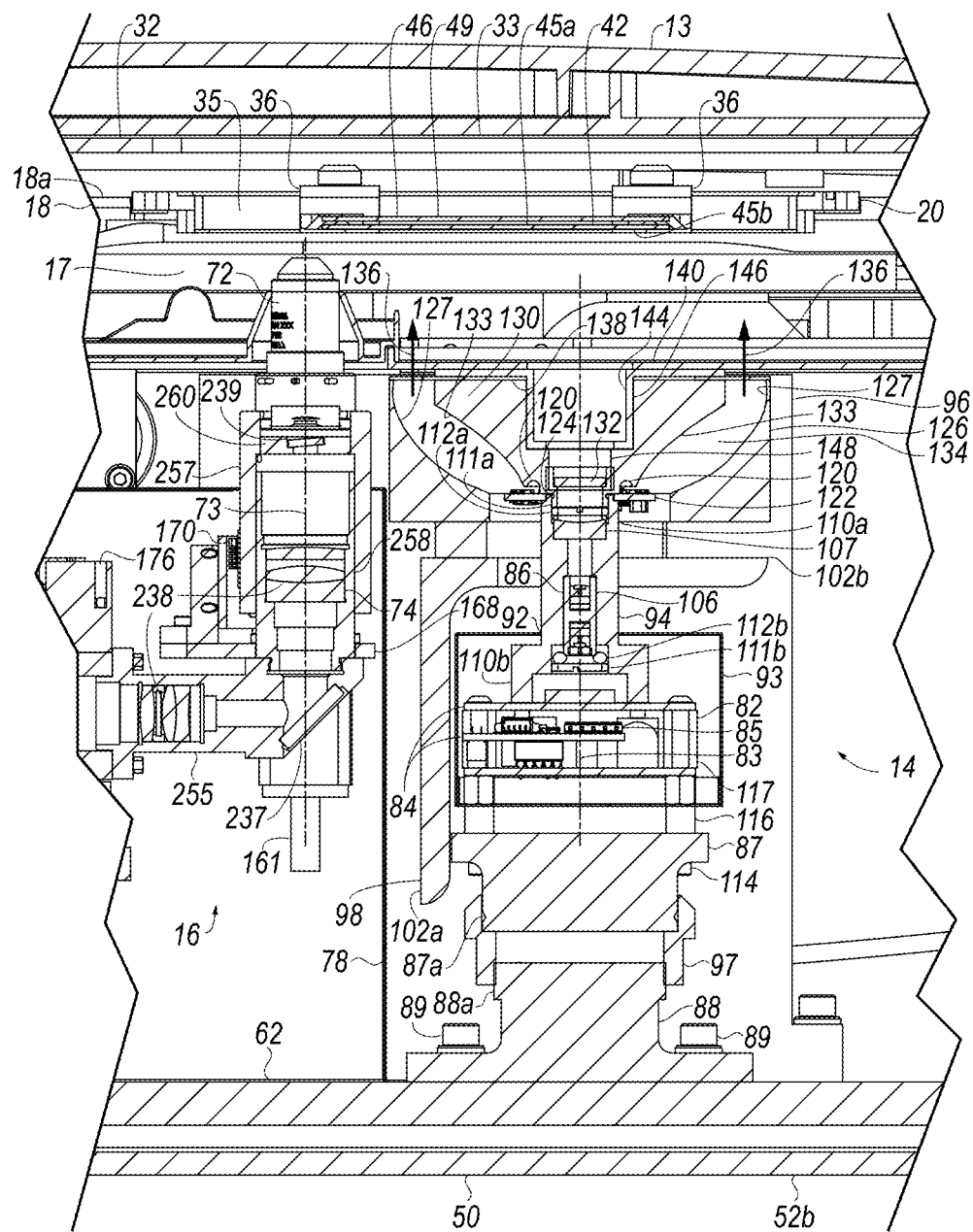
FIG. 4A is a broken view of the cross-sectional view of FIG. 4 enlarged to show the optics of the macroscopic imager and part of the optics of the microscopic imager in more detail.

Referring to the exploded views of FIGS. 3A and 3B, and cross-sectional view of FIGS. 4A and 4B, the assembly of stage 18, and imagers 14 and 16, in housing 12 is shown. Housing 12 has a generally rectangular case or casing 50 having fours sides 52a and an attached bottom 52b. Sides 52a attach to bottom 52b by screws 53 which extend through holes in four flanges 54a into threaded holes 55 along corner posts 54b in bottom 52b that extend upward to meet flanges 54a. Case 50 has an upper opening 56 having a recessed ledge 57 upon which upper wall 32 is attached by screws 58 (FIGS. 2A-C), via holes 59 in upper wall 32, into threaded holes 60 along the ledge 57. Sides 52a and bottom 52b of case 50 may be contoured as shown in the figures, but another case may be used to provide housing 12. Along bottom 52b of case 50 are feet 61 for supporting housing 12 upon a surface, such as a table.

Prior to assembly of case 50, a base plate 62 is attached to bottom 52b by screws 63 via holes in base plate 62 into threaded holes along bottom 52b. Two parallel vertical walls 64 attach by screws 65a to threaded holes 65b along base plate 62 for supporting stage 18. Stage 18 may be a typical two-dimensional translation stage having an upper portion 18a that moves along the x axis, and a lower portion 18b that moves along the y axis. For example, stage 18 may be a Marzhauser X-Y Stage Scan$^{Plus}$ Model No. 00-24-579-0000 (Manufacturer: Märzhäuser Wetzlar GmbH & Co. KG, Germany). A stage controller card may be provided in the case for computer system 22 to enable such interface with stage 18. In the case of Marzhauser X-Y Stage, such stage control card may be a Scan$^{Plus}$ Marzhauser X&Y Stage Controller Card, Part Number 00-76-150-0813. Stage 18 is mounted along the top of vertical walls 64 as typically in mounting stages to a base, such as by screws 66 via holes in two stage mounts 67 into threaded holes 68 along top of vertical walls 64.

Microscopic imager 16 is mounted to an upper plate 71a of a stage 70. The base 71b of stage 70 is attached to base plate 62 so that the objective lens 72 of microscopic imager 16 is disposed to extend upwards into an opening 17 of stage 18, and may extend at least partially into aperture 35 of platform 20 if needed to present objective lens adjacent bottom surface 45b of substrate 42. Base 71b is attached to base plate 62 by screws 75 into threaded holes 76 along base plate 62. In stage 70, upper plate 71a is movable with respect to base 71b in tip, tilt and rotation using micrometers 71c attached to internal gearing that couples upper plate 71a to base 71b in order to align the optical axis 73 of objective lens 72 to extend along a z axis orthogonal to the x and y axes along which stage 18 moves, and to rotate plate 71a so that the raster scan line of images captured by imager 16 is finely adjusted with movement of stage 18 along its y axis, as will be described later. For example stage 70 may be a Model No. TTR001—Tip, Tilt, & Rotation Stage manufactured by Thorlabs, Inc., but other stages may be used. A protective cover 78 is disposed over imager 16 and stage 70 so that objective lens 72 extends through an opening 79 in cover 78. Cover 78 may be attached by screws in the base of cover 78 to base plate 62. A cable 80 from electronics of imager 16 extends via another opening in cover 78 to a connector providing one of ports 24 mounted to opening 26 in case 50 providing the back of housing 12.

Microscopic imager 16 is preferably a confocal microscope for capturing optically sectioned images, such as used in the VivaScope® sold by Caliber Imaging and Diagnostics, Inc. of Rochester N.Y., USA. Such confocal microscope can capture microscopic sectional images of the tissue specimen at different depths within the tissue sample 44 and at the surface of such tissue sample 44 that lies against upper surface 45a of the substrate 42, from scanned illumination of one or more lasers focused and collected via objective lens 72 of optics 74. Movement of stage 18 enables automatic or manual selection of a particular location along the ex-vivo tissue sample 44 in terms of x and y coordinates, in which depth of the section on or in the tissue specimen is selected by moving an objective lens 72 along optical axis 73 aligned along the z axis of system 10 orthogonal to the x and y axes of stage 18 using stage 70.

The optical system providing optics 74, electronics of microscopic imager 16, and operation of computer system 22 with display 23 may be the same as described in U.S. Pat. No. 9,055,867, and preferably is the same as the imaging head of the confocal microscope of pending U.S. patent application Ser. No. 15/810,093, filed Nov. 12, 2017, which are both incorporated herein by reference. U.S. patent application Ser. No. 15/810,093 describes in detail the optical components and electronics of the imaging head of imager 16 being mounted along a chassis 176 and support plate 177, as shown and described in connection with FIGS. 9, 10, and 11 of the incorporated U.S. Patent Application.

Figure 6A:
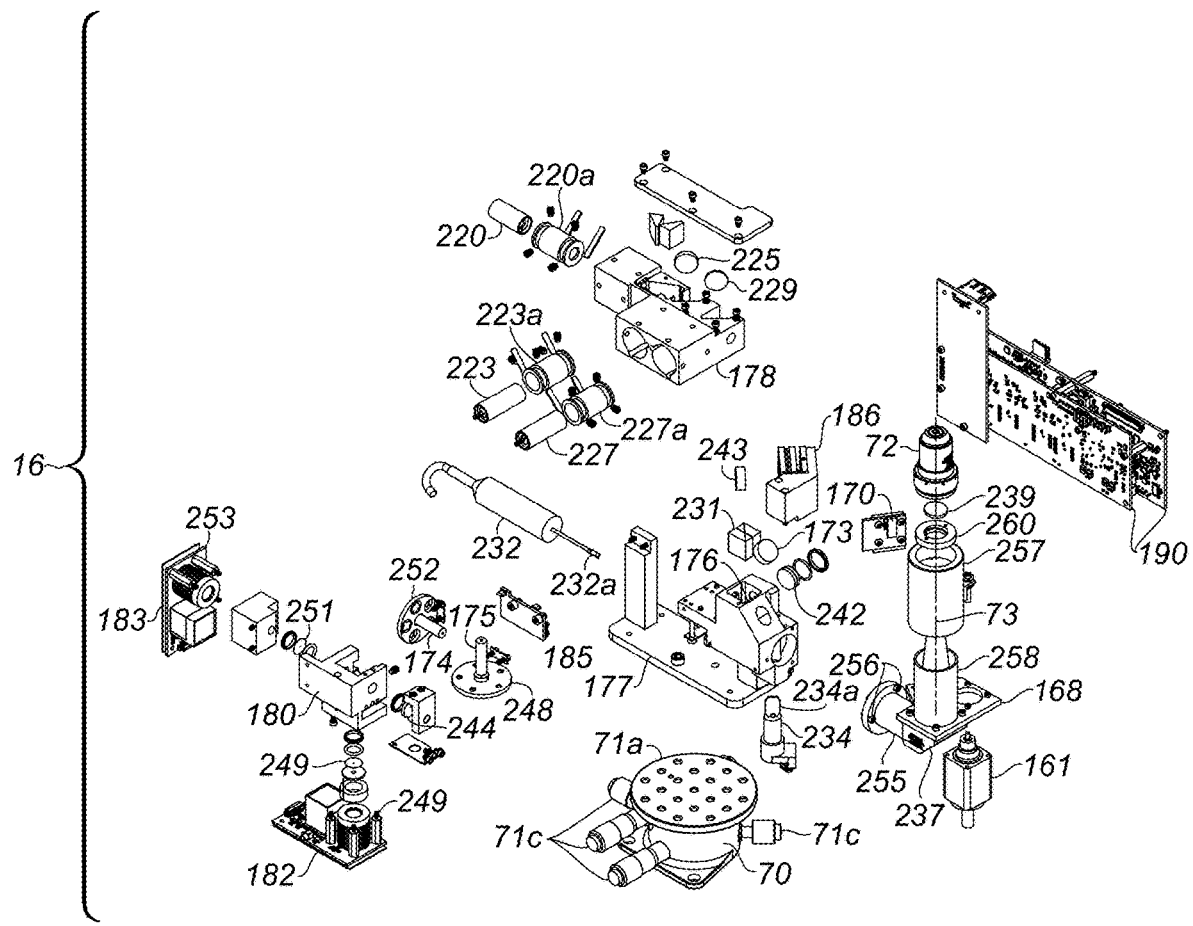
FIG. 6A is an exploded view of the microscopic imager removed from the housing of FIG. 1.
Figure 6B:
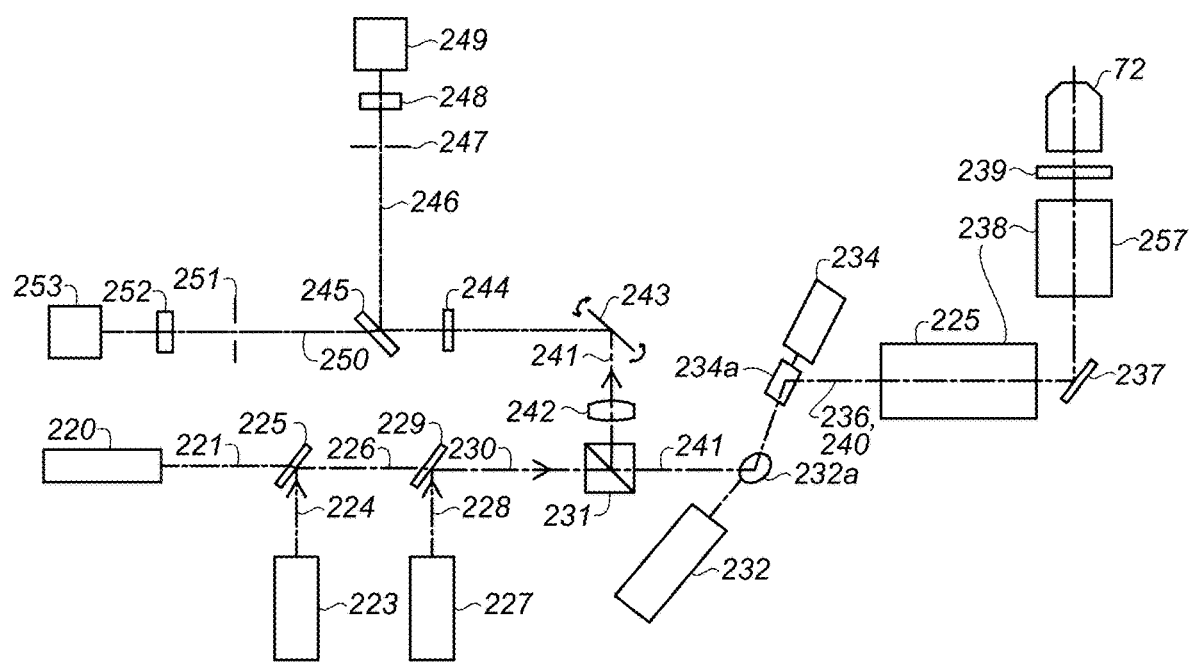
FIG. 6B is an optical diagram of the optical system providing the optics of the microscopic imager.

The particular application of the confocal microscope of U.S. patent application Ser. No. 15/810,093 as incorporated in system 10 is described below in reference to FIGS. 4, 4A, 6A, and 6B. Two printed circuit boards 190 with electronics for controlling the confocal imaging head of microscopic imager 16, responsive to computer system 22, are attached to chassis 176, where circuit boards 190 are connected to other circuit boards described herein. While FIG. 6A shows an exploded view of the microscopic imager 16 assembly shown in FIG. 4, the optical diagram of FIG. 6B best illustrates the operation of the optical system providing optics 74 of microscopic imager 16 for enabling imaging. A first laser illumination source 220 provides a linearly polarized beam 221 at a single wavelength (e.g., 488 nm), and a second laser illumination source 223 provides a linearly polarized beam 224 at a different single wavelength (e.g., 785 nm). Beam 221 is combined with beam 224 into a beam 226 by a dichroic filter 225. If desired, an optional third laser illumination source 227 may be provided producing a linearly polarized beam 228 at a different discrete wavelength than that of beams 221 and 224 (such as at 405 nm, 561 nm, or 640 nm). If laser source 227 is present, beam 226 combines with beam 228 by a dichroic filter 229 to provide beam 230. Laser sources 220, 223 and 227 preferably are laser diodes received and retained in cylindrical tubes 220a, 223a, and 227a, respectively, each with an opto-detector for monitoring their laser power, and then mounted with filters 225 and 229 in a structure or block 178, such as of aluminum, which is mounted to chassis 176.

Beam 226 (or beam 230 if source 227 is present) passes through a polarizing beamsplitter 231. A resonant scanner 232 presents its scanning mirror 232a to beam 226 (or beam 230 if source 227 is present), and the beam from the resonant scanner mirror 232a is then incident scanning mirror 234a of a galvanometer 234 to provide a scan beam 236. Mirrors 232a and 234a oscillate so that mirror 232a fast or horizontal line scans in a raster being scanned, and slow or vertical scan and retrace are provided by mirror 234a, as described in the incorporated U.S. Pat. No. 9,055,867. The axes of oscillation of these mirrors 232a and 234a are orthogonal (perpendicular) to each other. The separation distances may be approximately a minimum separation distances to provide clearance between the mirrors as they scan. A telescope 238 magnifies (e.g., 2.3×) and relays scanning beam 236 to objective lens 72 via a quarter wave plate shifter 239, and the objective lens 72 focuses the scanning beam 236 to the tissue sample 44 being imaged on substrate 42 when stage 18 presents the scanning beam 236 to a location along such tissue sample 44.

The return light 240 from the tissue sample 44 passes through objective lens 72, quarter wave plate 239, telescope 238, and scanning mirrors 232a and 234a. The return light thus is descanned by mirrors 232a and 234a into a stationary beam 241 and enters the polarizing beamsplitter 231 which reflects beam 241 via a focusing lens 242, a reflecting mirror 243, and a notch filter 244, to a dichroic beamsplitter 245 which splits the returned light into a first beam 246 and a second beam 250. Beam 246 is incident a small aperture provided by pinhole 247 onto a detector 249 via one of selectable open or filter positions along a filter wheel 248. Beam 250 is incident a small aperture provided by a pinhole 251 onto a detector 253 via one of selectable open or filter positions along a filter wheel 252. Each filter wheels 248 and 252 has a motor 174 and 175 which can move the wheel to select a position of a desired optical filter or opening (if present) along the wheel. Detectors 249 and 253 may each be provided by a photomultiplier tube on circuit boards 182 and 183, respectively, which are then mounted to support plate 177. Lens 242 focuses returned light beam 241 split into beams 246 and 250 onto respective pinholes 247 and 251. Although not shown in FIG. 6B, a turning mirror 173 may be provided between beamsplitter 231 and mirror 232a to reflect beam 226 (or beam 230 if source 227 is present) onto mirror 232a, and reflects beam 241 from mirror 232a to beamsplitter 231. Electrical signals outputted from each of detectors 249 and 253 are received by electronics of the imager 16 to provide video signals, timed in accordance with fast and slow scan mirrors 232a and 234a, representative of sectional microscopic image on or in tissue sample 44 for communication to computer system 22 as described in incorporated U.S. Pat. No. 9,055,867.

As the illumination of the tissue sample 44 is of multiple discrete wavelengths in accordance with laser sources 220, 223, or 227, detectors 249 and 253 receive different wavelengths of the collected illumination beam 241 from objective lens 72 to enable simultaneous capture of a same one of the microscopic images at the different wavelengths or wavelength range on detectors 249 and 253 in accordance with selected position of one of optical filter or an opening on filter wheels 248 and 252, respectively. Where one or more of the discrete wavelengths of illumination can activate fluorescent dye(s) that may be applied to tissue sample 44, a selected optical filter along wheels 248 and 252 is positioned in the path of the beam to detectors 249 and 253 to enable detection of fluorescent wavelength(s) associated with the dye(s) on their associated detector. Where non-fluorescent imaging is desired, a selected open position along wheels 248 and 252 is positioned in the path of the beam to detectors 249 and 253 to detect a discrete wavelength of illumination of the scanned illumination 236 to the tissue sample. Notch filter 244 allows selectable discrete wavelengths or ranges of wavelengths to assist in detecting wavelengths with filters along the filter wheels. Preferably, notch filter 244 allows light of wavelength of laser 223 (e.g. 785 nm), and blocks light of wavelengths which may interfere with imaging at fluorescent wavelengths associated with the filters disposed along filter wheels 248 and 252 in the path of light for detection by their respective detectors 249 and 253. Due to the perspective of the exploded angular view of FIG. 6A, not all components of optics 74 shown in FIG. 6B can be seen in FIG. 6A. Also, while multiple laser sources and two detectors are preferred, a single laser source and single detector for detecting reflectance microscopic images, such as at 785 nm wavelength, may be provided in optics 74.

The microscopic imager 16 differs from that shown in incorporated U.S. patent application Ser. No. 15/810,093 in that the support plate 177 is attached by screws into threaded holes along upper plate 71a of stage 70, and the path of scanned illumination 236 focused by, and collected returned light 240 from, objective lens 72 is reflected by a fixed mirror 237 in a fixture attached by a tube or barrel 255 by screws 256 into threaded holes along the front of chassis 176 so such path can then extend along optical axis 73 of objective lens 72 when aligned along the z axis of system 10, as described earlier using stage 70. Objective lens 72 is disposed at the upper end of a barrel 257 providing a tube or sleeve moving axially (along optical axis 73) by a linear actuator, as described in the incorporated U.S. Pat. No. 9,055,867, over a fixed tube 258 attached to a plate 168. Objective lens 72 may be moved along the optical axis 73 (extending parallel to the z axis of system 10) so as to focus the beam at selected locations at the surface or the internal sections of the specimen to be imaged. The quarter wave plate 239 is retained in a holder 260 mounted in end of barrel 257 receiving objective lens 72. Lenses in barrel 255 and fixed tube 258, along the scanning illumination 236 and collected returned light 240 paths bent 90 degrees by angled mirror 237, provide telescope 238. A magnetic strip is provided on the side of barrel 257 which is read by a sensor 170 that linearly encodes position of the barrel 257 to the electronics of imager 16, thereby enabling computer system 22 to actuate a linear motor 161 to adjust the position of objective lens 72 with respect to telescope 238 and hence the focus of such lens 72 with respect to the tissue sample 44.

While components providing multiple wavelengths of laser illumination as described in the incorporated U.S. Patent Application may be used, preferably two laser sources 220 and 223 of wavelength 485 nm and 785 nm, respectively, are provided in microscopic imager 16, however, different wavelength lasers, or additional laser(s) may be used, such as by providing laser source 227. Power and ground to electronics and other components in imager 14 and 16 and stage 18 are provided by wires within cables to ports 24 and 25 along housing 12. Other optical sectioning microscopes may provide microscopic imager 16, such as those operative by optical coherence tomography (OCT), or two-photon laser microscopy.

To enable faster image acquisition by imager 16, computer system 22 can fix the position of galvanometer mirror 232a, and instead move stage 18 in a stepwise fashion along the y axis to provide comparable raster scan imaging. It has been found however unless the raster scan lines follows precisely travel of the stage 18 moving along the y axis, successive raster image lines will not align in each frame of the microscopic images. To solve this problem, a calibration target with crosshair or other reticle lines representing a full frame is located in tissue specimen mounting platform 20 in a same position as substrate 42 (thus such crosshairs align parallel with x and y axes of stage 18 motion), and stage 18 moved to present such target to objective lens 72 so that microscopic images of the target are shown on display 23. Stage 70 is rotated by one of micrometers 71*c* (or other ones of micrometers 71*c* if needed) until a full frame is captured without any breaks in the captured image displayed, thus aligning stage 18 movement along the y axis with the raster scan line. Stage 18 repeats movement in a first direction than in the reverse direction along the y axis as a full frame is captured, and in each pass along the first direction follows the same direction of raster scan line of mirror 232*a* albeit faster in speed than mirror 234*a*. Optionally, the raster scan lines can be captured in both first direction and in the reverse direction to further increase the acquisition time of each frame.

Each filter wheels 248 and 252 has a motor 174 and 175 driven by electronics on a printed circuit board 185 to select a position of one of multiple optical filters or an opening desired along each filter wheel for light returned on their respective detectors 249, and 253, via their respective pin holes 247 and 252. For each wheel, the printed circuit board 185 has a Hall effect sensor which reads a magnet along the wheel to sense the home position of the wheel and rotate the wheel to the desired filter or open location along the wheel by actuation signals received from computer system 22 as stored in its memory. Circuit board 185 for driving and controlling motors 174 and 175 may be supported on circuit board 182. A structure or block 180, which may be of aluminum, is mounted to chassis 176 to support filter wheels 248 and 252, pinholes 247 and 252, beamsplitter 245, and notch filter 244, for imaging onto such detectors 249 and 253 as described earlier. Pinholes 247 and 251 (i.e., each provided by a thin substrate with light blocking material having a small aperture) may have components shown in FIG. 6A for mounting in structure 180. In order to properly align beams 246 and 250 for detection on respective detectors 249 and 253, mirror 243 and one or more of pinholes 247 and 251 may each be adjustable in position. For example, pinhole 247 may be mounted in a cylinder, prior to being mounted in structure 180, and positionally adjustable in such cylinder using set screws with respect to beam 246, and mirror 243 mounted upon an adjustable flexure attached to a bracket or flange 186 of chassis 176 for steering beam 250 via beamsplitter 245, so that both beams 246 and 250 are aligned for detection. Pinhole 251 may optionally be similarly adjustable in position.

Referring to FIGS. 3A, 3B, 4, and 4A, macroscopic imager 14 is shown having a digital camera 82 with two circuit boards 84 for presenting a two-dimensional detector array 85 of pixel sensing elements, such as a CCD, for capturing two-dimensional color images aligned with the x and y axes of stage 18, via optics 86 that focus along an optical axis 83 at or near the plane of the upper surface 45*a* of substrate 42 when stage 18 is positioned to present substrate 42 to imager 14. The circuit boards 84 of the digital camera 82 are attached to a mounting plate 87 that attaches, via a cylindrical coupling member 97, to a base 88, which is mounted by screw 89 into threaded holes 90 (FIGS. 3A and 3B) along base plate 62. Macroscopic imager 14 has an illumination system 96 which illuminates aperture 35 of platform 20 to provide light to enable proper capture of macroscopic images by imager 14 of tissue sample 44. Macroscopic imager 14 and its illumination system 96 are described in more detail below in connection with FIG. 5. A protective cover 93 is disposed over circuit boards 84 with an opening 92 through which is extended a barrel 94 supporting optics 86 disposed over the array 85 of sensing elements upon the uppermost one of circuit board 84. An "L" shaped plate 98 is attached between vertical walls 64 by screws received via holes 99 in walls 64 into threaded holes 100 along opposite ends of plate 98. Plate 98 has a vertical portion 102*a* and a horizontal portion 102*b* with an opening 101 through which extends barrel 94 of macroscopic imager 14 after passing through opening 92 of cover 93 (FIGS. 4A and 4B).

Figure 5:
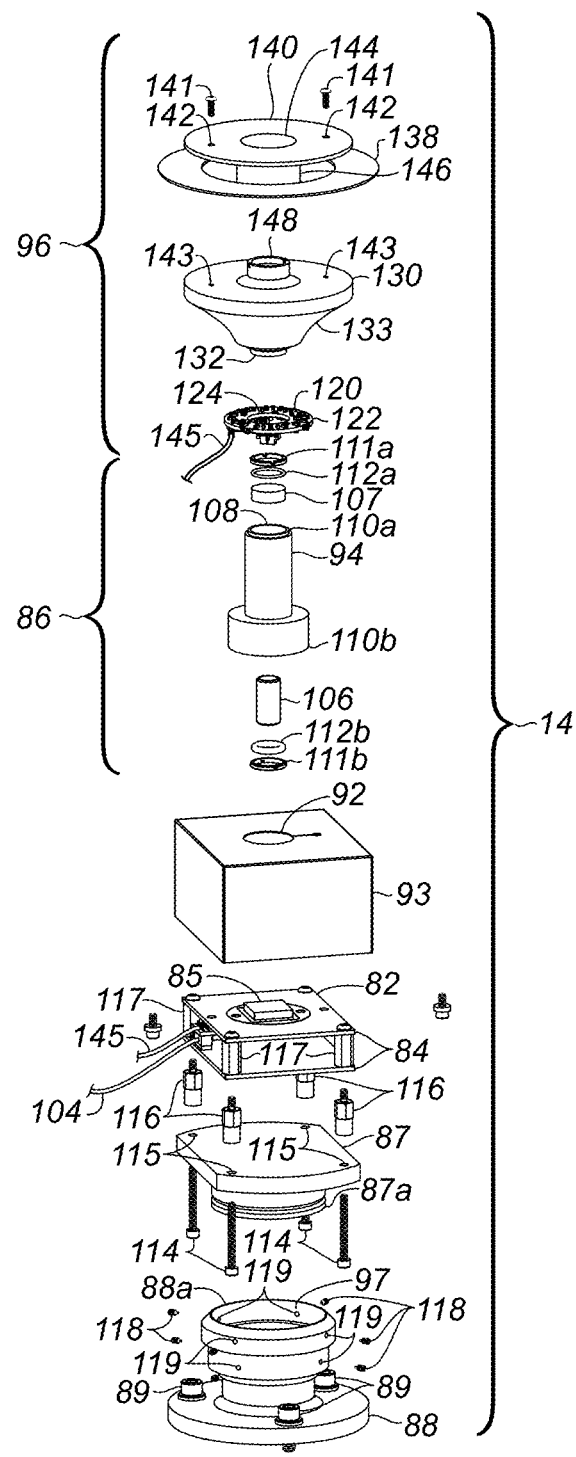
FIG. 5 is an exploded view of the assembly of the macroscopic imager removed from the housing of FIG. 1.

Referring to FIG. 5, an exploded view of the assembly of the macroscopic imager 14 is shown. Macroscopic imager 14 has a digital camera 82, such as Model No. LW570, sold by Lumenera Corporation of Ottawa, Ontario, Canada. Digital camera 82 is an assembly of two circuit boards 84 with array 85 of sensing elements and electronics enabling high resolution, such as 5 Megapixel, color images. Unlike microscopic imager 16, digital camera 82 provides a larger, macro view of the ex-vivo tissue sample 44 without microscopic resolution. A cable 104 from electronics of imager 14 provided by digital camera 82 extends via an opening 92 in cover 93 to a connector providing another one of ports 24 mounted in opening 26 of case 50.

The optics 86 of macroscopic imager 14 comprise a relay lens 106 and a plano-concave lens 107 which are contained in barrel 94. Barrel 94 has an opening 108 with an upper end 110*a* of a diameter for receiving the plano-concave lens 107, and a lower end 110*b* of a diameter and length for receiving relay lens 106. To retain each of the lens 106 and 107 in barrel 94 are two externally threaded retainer rings 111*a* and 111*b*, which after placement of O-rings 112*a* and 112*b* to upper and lower end 110*a* and 110*b*, respectively, of opening 108 engage threads along the entrance into such upper and lower end 110*a* and 110*b*, respectively, of opening 108. Preferably, a liquid adhesive is applied to fix rings 111*a* and 111*b* in position after engaging barrel 94. Barrel 94 may be mounted to upper one of circuit board 84 over array 85 by two screws into holes on either side of array 85. Mounting plate 87 is attached to circuit boards 84 by screws 114 extending, via holes 115, in mounting plate 87 into threaded holes of four standoffs 116 having threaded ends that screw into threaded holes into four standoffs 117 that couple the circuit boards 84 together. Plate 87 extends to a lower cylindrical end 87*a* with external threads which engage upper interior threads of cylindrical coupling member 97. Coupling member 97 has lower interior threads which engage threads along the upper cylindrical end 88*a* of base 88. To adjust the focus of macroscopic imager 14, a target with crosshair or other reticle line(s) is located on tissue specimen platform 20 in the same position as substrate 42 (thus such crosshairs or reticle lines align parallel with x and y axes of stage 18 motion) so that a macroscopic image (or images, such as video) thereof is shown on display 23, and coupling member 97 is rotated clockwise or counterclockwise to raise or lower plate 87 until the target is in focus on display 23. When focus is achieved, set screws 118 which extend through threaded holes 119 along coupling member 97 and/or base 88 to fix the coupling member 97 in position. The target may be used further to assure that the two-dimensional images captured by array 85 at least approximately align with x and y axes of stage 18. With plate 87 so coupled to housing 12, optics 86 and array 85 of macroscopic imager 14 are so fixed in position in housing 12 so that two-dimensional macroscopic images captured by array 85 extend parallel with x and y axes of stage 18, and optical axis 83 extends at least approximately parallel with the z axis orthogonal to the x and y axes of system 10. Thus, as optical axes 73 and 83 are oriented parallel to the z axis of system 10, they are at (or at least approximately) co-axial with each other.

Illumination system 96 is provided by LEDs 120 mounted in a ring along an annular circuit board 122 having a central opening 124, and uses reflective surfaces 127 and 133 to reflect light from the LEDs 120 upwards without directly being incident tissue sample 44 disposed on substrate 42. This is achieved by a cylindrical member 126 having circular symmetric parabolic reflective surface (or reflector) 127 which increases in diameter as it extends upwards from a central aperture 128 into which extends the upper end of barrel 94, thereby aligning parabolic reflective surface 127 along optical axis 83. Received in cylindrical member 126 is a truncated conical member 130 having a lower end 132 and a central opening 131 extending through member 130, via lower end 132, along optical axis 83. The lower end 132 is mounted into upper end of barrel 94 after extending through central opening 124 of circuit board 122 in order to mount the circuit board 122 at the base of parabolic reflective surface 127. The truncated conical member 130 has an outer conical reflective surface 133 which increases in diameter from lower end 132 until it nears the height of cylindrical member 126. Illumination produced by the light sources provided by LEDs 120 passes into a gap 134 between conical reflective surface 133 and parabolic reflective surface 127 and exits upwards along a path 136 as indicated by arrows in FIGS. 4 and 4A. While reflective surface 133 may be smooth, reflective surface 127 is preferably unfinished and less smooth than surface 133 and at least partially diffuses light before exiting upwards in gap 134 along path 136 about the circumference of truncated conical member 130.

A ring of polarizer film 138 is disposed about the top of truncated conical member 130 to extend over gap 134 so that light from LEDs 120 (and/or reflected by surfaces 127 and 133) exiting gap 134 passes through polarizer film 138 to provide polarized light for use in illuminating tissue sample 44 when present over macroscopic imager 14. The polarizer film 138 is retained in position over gap 134 by a circular plate 140 and screws 141 that extend via holes 142 in plate 140 into threaded holes 143 along the top of truncated conical member 130 so that plate 140 clamps polarizer film 138 over gap 134. Plate 140 has a central aperture or opening 144 with a downwardly extending cylinder 146 mounted to plate 140 or part of such plate 140. Cylinder 146 extends downwardly from plate 140 into central aperture 131 of truncated conical member 130. A polarizing lens 148 is mounted in aperture 131 of truncated conical member 130 prior to cylinder 146 being disposed downward in central aperture 131. As the illumining light is polarized 90 degrees by polarizer film 138 along the illumination path 136 to tissue sample 44, returning light from tissue sample 44 is depolarized by polarizing lens 148 before reaching array 85. The returning light representative of a macroscopic image of tissue sample 44 travels along an imaging path from tissue sample 44 through aperture 144, cylinder 146, polarizing lens 148, aperture 131 of truncated conical member 130, and central opening 124 of annular circuit board 122, and is imaged by optics 86 in barrel 94 onto array 85 of sensing elements. Plate 140 and cylinder 146 are of black anodized plastic material, which improves imaging by array 85 by blocking light along the imaging path which is not associated with light representative of tissue sample 44.

Disposed over plate 140 is shown an optional tray 150. Tray 150 has an opening 151 aligned with aperture 144 of plate 140 and cylinder 146. Screws 141 extend into holes 153 along tray 150 to retain the tray in position with objective lens 72 of imager 16 extended through an opening 152 of tray 150. A cylindrical wall may extend upwards along opening 152 to form a generally conical structure with an open top of a diameter for receiving there through objective lens 72. The tray 150 is of optically transparent material, such as clear polycarbonate, to pass light from illumination system 96 of macroscopic imager 14. While tray 150 is optional, it extends under stage 18 to provide a mechanism for catching any debris which may inadvertently fall via aperture 35 of platform 20, and further protects imagers 14 and 16.

The LEDs 120 of illumination system 96 are activated responsive to power being supplied by a cable 145 (FIG. 5) from circuit board 122 to the electronics of the digital camera 82 on circuit boards 84. LEDs 120 are enabled by such electronics responsive to signals received from computer system 22 to activate camera 82, and power is disable to LEDs 120 when camera 82 is not activated. Optionally, the user can toggle the LEDs 120 of macroscopic imager 14 on and off as desired, and in response computer system 22 communicates with such electronics to enable or disable the LEDs accordingly. For example, sixteen LEDs 120 may be used spaced in a ring along circuit board 122. Such LEDs 120 may be white light sources, but other wavelengths of emitted light may be used depending on the sensitivity of array 85 sensing elements to returned light from the illuminated tissue sample 44 with light from LEDs 120.

Base plate 62, vertical walls 64, and plate 98 are of rigid material, such as stainless steel or aluminum. Case 50, upper wall 32, cover 13, protective covers 78 and 93, and tray 150 may be made of molded plastic material. Also, a fan 154 is mounted onto base plate 62 by screws 155 in holes 156 along base plate 62, and powered by electronics on microscopic imager 16. While holes in base plate 62 are described above as being threaded for receiving their respective screws, such holes in base plate 62 need not be threaded, and nuts may be then used to secure the ends of such screws to base plate 62. Cylindrical member 126 and truncated conical member 130 may also be formed from stainless steel or aluminum, or other rigid material, and if needed coated with a layer of reflective material, such as aluminum.

As shown in FIGS. 4 and 4A, the optical axis 73 of objective lens 72 of microscopic imager 16 are aligned along the vertical z-axis orthogonal to x and y axes of system 10 along which stage 18 is movable. During manufacture, or for maintenance with removal of casing 50 and the plate providing upper wall 32 from housing 12, a substrate having downward facing reflective surface along the xy plane of x and y axes of the stage 18, such as a mirror, is placed upon platform 20 in the same manner as substrate 42 described earlier, and the stage 18 is positioned so that an image from microscopic imager 16 is shown on display 23. Micrometers 71c of stage 70 are adjusted as need in the tip, tilt, and rotation of upper plate 71a of stage 70 until a maximum bright spot appears on display 23 to a technician indicating that the optical axis 73 of imaging is perpendicular to the reflective surface. The substrate having a reflective surface is then removed, and tilt adjustment is complete. As macroscopic imager 14 by virtue of its mounting in housing 12 has been found not to require tilt or tip adjustment to align along optical axis 83 of optics 86 with z axis of system 10.

Rather, adjustment of focus as described earlier provides sufficient alignment for imaging of tissue sample 44 by macroscopic imager 14. However, if desired, the same substrate used for alignment for microscopic imager 16 may be used to verify that optical axis 83 is aligned parallel to z axis of system 10 by similarly viewing one or more macroscopic images of such substrate on display 23.

The start x and y positions of stage 18 for each of macroscopic imager 14 and microscopic imager 16 are determined using a target with crosshairs or other reticle lines in tissue specimen mounting platform 20 in place of substrate 42 which enable such crosshairs or reticle lines to align parallel with x and y axes of stage 18 motion. Stage 18 first is positioned by a technician to provide one or more macroscopic images to align the target with macroscopic imager 14 on display 23, in the same manner as in focus adjustment described earlier. The computer stores in memory the x and y start position of the macroscopic imager 14. Stage 18 is next positioned by the technician to provide one or more microscopic images to align the target with microscopic imager 16 on display 23 both in x and y of stage, and along the z axis by moving objective lens 72 along its optical axis 73 to determine zero depth. The computer system 22 stores in memory the x, y, and z start position of the microscopic imager 16. The above calibration of microscopic imager 16, and if desired of macroscopic imager 14, and setting of start positions for use with such imagers, may be carried out by a technician in system 10 using the same graphical user interface on display 23 as described below in connection with FIGS. 8, 10, and 12.

Referring to FIGS. 2A-2E and 7-12, the operation of system 10 starts with tissue sample 44 being placed upon upper surface 45a of substrate 42 which is retained between arms 36 of tissue specimen mounting platform 20 of stage 18, as described earlier and shown in FIGS. 2B and 7. The tissue sample 44 may be placed on substrate 42 before or after the substrate in placed in a retained position on the tissue specimen mounting platform 20. If desired, the user has placed cover substrate 46 over substrate 42, but typically such is not preferred until after sample orientation verification, and any manual tissue repositioning if needed, is completed. Computer system 22 sends signals to the x and y motors of stage 18 to move platform 20 to the stored start x and y position in memory of computer system 22 centered with optical axis 83 of macroscopic imager 14 onto tissue sample 44, and signals to the electronics of macroscopic imager 14 to capture macroscopic images with LEDs 120 actuated. The cover 13 at this time may be in up or down state, as desired by the user.

Next, tissue sample orientation verification is performed as often outer edge(s) of tissue sample 44 and the tissue sample's surface facing upper surface 45a of substrate 42 are non-planar with respect to surface 45a. Such can be due to the tissue sample 44 being folded over each other, or air bubble(s) being present between tissue sample 44 and surface 45a, keeping the tissue from lying flat or planar upon surface 45a. In the example of FIG. 7, a fold 44a of the tissue sample 44 is present.

Figure 8:
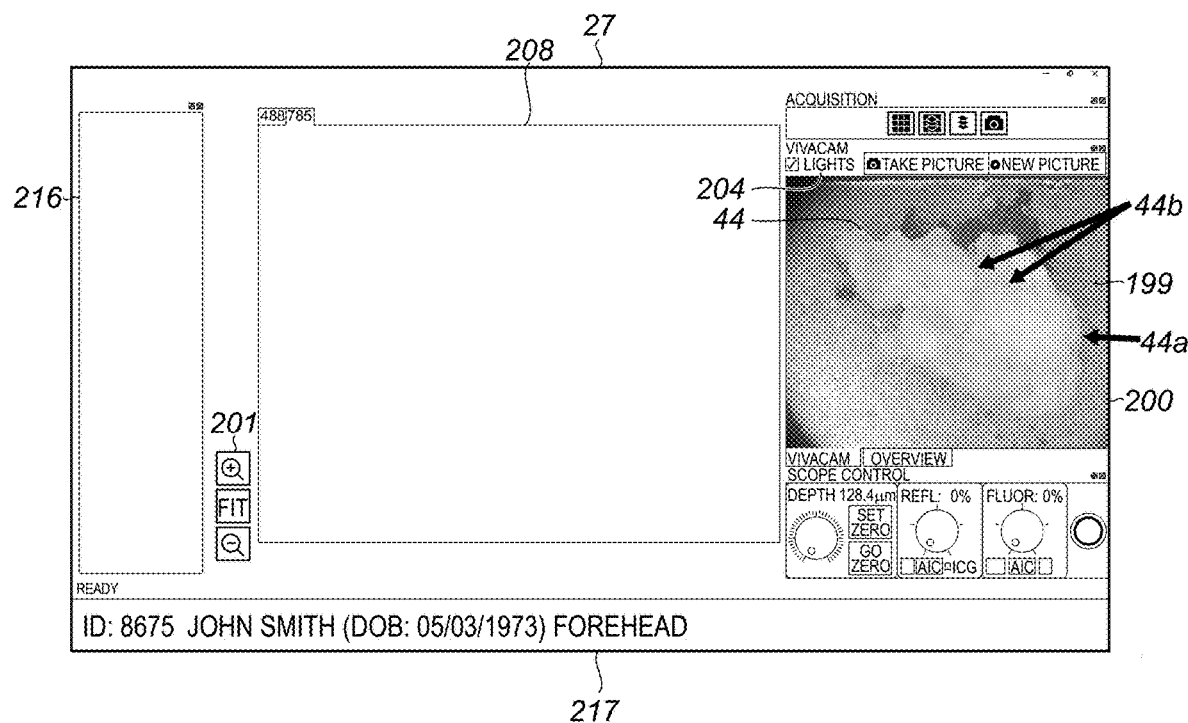
FIG. 8 is an example of a screen of the display of the system of FIG. 1 having a window for showing macroscopic images of the tissue sample of FIG. 7 captured by the macroscopic imager, wherein portions of the tissue sample are unfocused and hence not positioned substantially flush or flat against the upper surface of the substrate.
Figure 9:
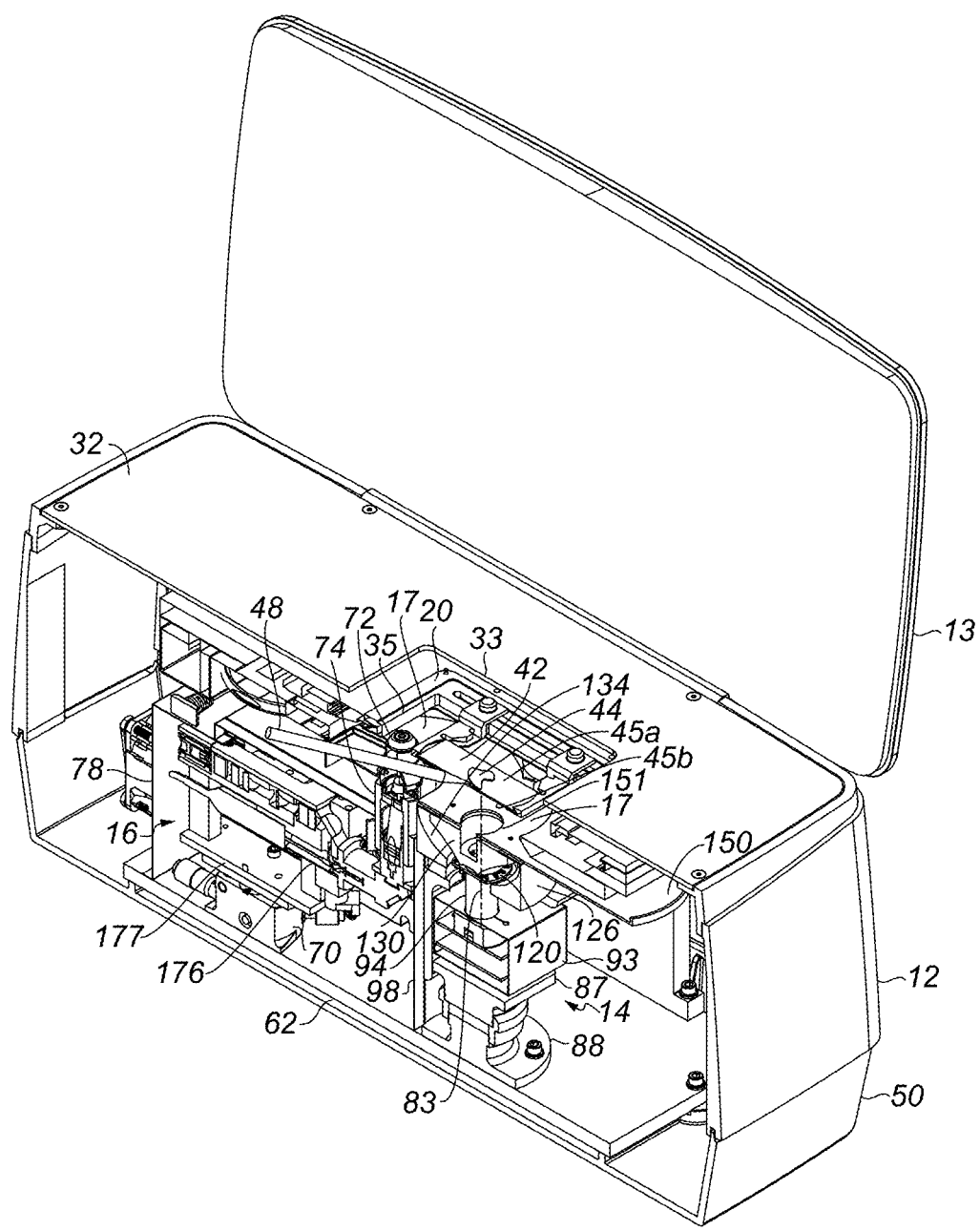
FIG. 9 is the same perspective cross-sectional view of the housing of FIG. 7 showing an example of an external tool for manipulating a portion of the ex-vivo tissue sample unfocused in the window of the display showing macroscopic images of the tissue sample, where such tool reorients such portion to lay substantially flush against the substrate in a desired orientation for later microscopic imaging.
Figure 10:
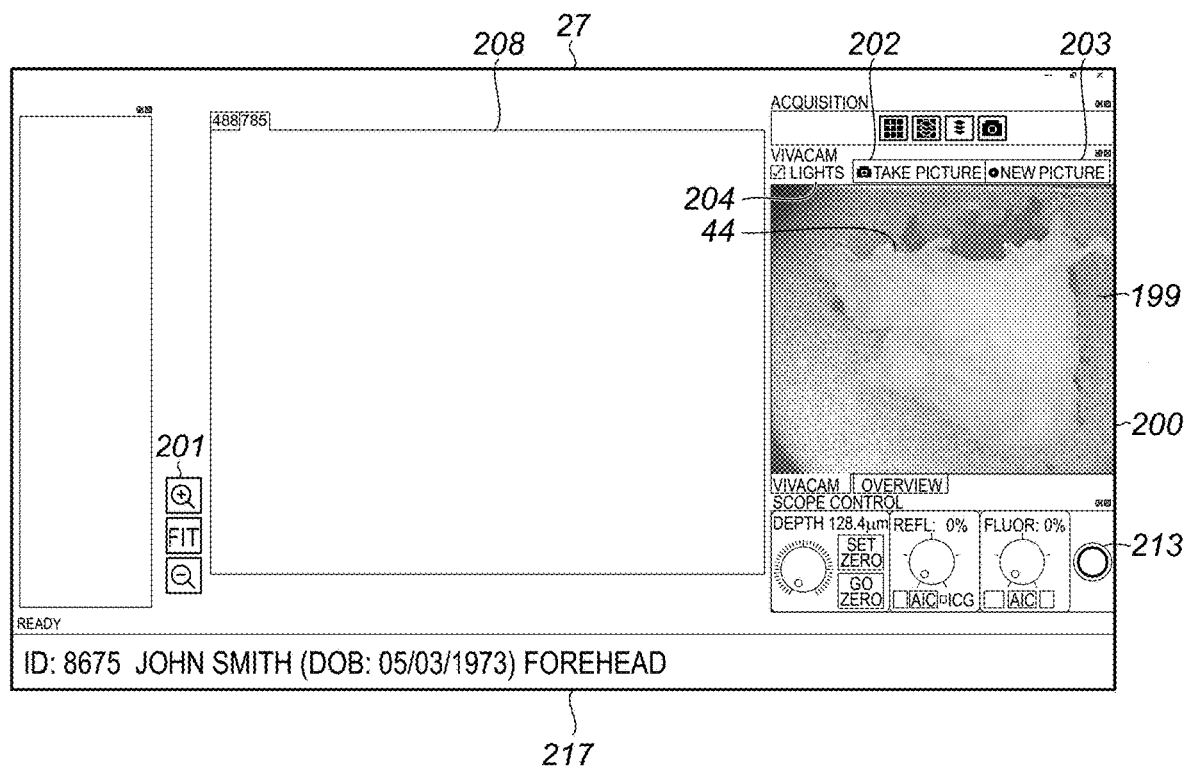
FIG. 10 is an example of the same screen of display of FIG. 8 having the window for showing macroscopic images of the tissue sample of FIG. 9 captured by the macroscopic imager, verifying that the ex-vivo tissue sample is now in focus and hence lying substantially flush or flat against the upper surface upon the substrate in a sufficient proper planar orientation for microscopic imaging to be carried out.

In FIG. 8, an example graphical user interface on screen 27 of display 23 is shown having macroscopic images 199 captured by array 85 of macroscopic imager 14 displayed in a window 200 as video. Fold 44a in the image in window 200 appears out of focus (fuzzy) with the rest of the image, further while not readily apparent to the user, additional portions or areas 44b along tissue 44 are now seen that are also not in focus and hence not planar with upper surface 45a of substrate 42. Areas 44b may be due to non-planar side edges of the tissue sample or excessive air bubbles. As shown in FIG. 9 with cover 13 in an up or open state, a user manually locates an end of tool 48 to gently unfold the fold 44a, and manipulate areas 44b until the images 199 in window 200 are in focus as shown in FIG. 10. Optionally, computer system 22 may have software which automatically processes the macroscopic images 199 to determine presence of any unfocused areas of the images, and graphically indicates any unfocused portions on the display of said macroscopic images, such as using arrows as depicted in FIG. 8, to assist the user.

Another view of tool 48 operating upon fold 44a is shown in FIG. 2D. As stated earlier, cover substrate 46 is applied upon substrate 42 to retain the desired orientation of tissue sample 44 against upper surface 45a of substrate 42. The downward pressure of cover substrate 46 applied along the top of the tissue sample 44 can further keep any manipulated non-planar side edges planar against surface 45a. The resulting substrate-tissue sample-substrate sandwich or carrier 49 is shown in FIGS. 2E, 4, and 11. Optionally, an index matching fluid is applied the tissue sample 44 prior to placement of cover substrate 46 to minimize reflection and spherical aberration when later imaged by microscopic imager 16. Typically, the tissue sample 44 is stained and washed with saline prior to being placed on substrate 42 without an index matching fluid. If desired, such stain may be a fluorescent dye applied to the tissue sample 44 that can be activated by one of the laser illumination sources of microscopic imager 16 in order to enhance tissue structures of interest. Less preferably, imaging by the microscopic imager 14 is carried out without cover substrate 46.

If the macroscopic images of tissue sample 44 in window 200 of screen 27 is not centered, the user via keyboard 28, joystick 30, or mouse 29 clicking on graphical elements associate with stepwise motion of x and y motors as desired. The images from imager 14 may be captured having approximately a 25 mm square field of view from array 85 of digital camera 82. By changing optics 86 and/or size of array 85, different fields of view can be captured, as may be useful to capture larger tissue samples than presented in the example of tissue sample 44. Optionally, the field of view may be electronically zoomed in or out by either image processing of computer system using buttons 201 (or by signals from the computer system 22 to the electronics of camera 82 of macroscopic imager 14 to provide a different resolution image if available), as needed to select a different field of view which captures the entire tissue sample 44, or such part of tissue sample 44 of interest.

With the tissue sample 44 verified in this manner as being properly oriented against upper surface 45a of substrate 42, i.e., all (or areas of interest) are sufficiently planar or flush against surface 45a, and any centering and/or zooming is completed, a picture of the tissue sample is captured by the user selecting with the mouse 29 a "Take Picture" button 202 on screen 27. A still macroscopic image 206, rather than a live video images from imager 14, is now displayed in window 200 and stored in memory of computer system 22 for later use as a guide or map when capturing microscopic images. Still macroscopic image 206 represents one of such macroscopic images 199 captured by array 85. If the still macroscopic image 206 is not acceptable to the user, the user selecting with the mouse 29 a "New Picture" button 203 on screen 27 returns to the video of macroscopic images 199 from macroscopic imager 14 in window 200, and then a new still macroscopic image 206 of tissue sample 44 can be captured using button 202 and stored in memory of computer system 22. Also, a "Lights" button 204 can be selected by the mouse 29 to toggle the LEDs 120 of macroscopic imager 14 on and off as desired, since sufficient ambient light may be present when cover is up or open without the need for illumination of the tissue sample 44 using light from LEDs 120. The cover 13 may be in an open and up state when images are captured by macroscopic imager 14. However, the cover 13 may be down state if desired when capturing still macroscopic image 206.

Next, a drop of index matching fluid, such as ultrasonic gel, is placed upon the upper tip of objective lens 72 by the user prior to moving stage 18 to the start position for microscopic imager 16. Such upper tip of objective lens 72 being accessible via aperture 35 (FIGS. 2B, 7 and 9). Objective lens 72 is optically coupled by such fluid to bottom surface 45*b* of substrate 42 to minimize reflection and spherical aberration as objective lens 72 is located at the start z position and moves along bottom surface 45*b* to one or more different locations upon or within tissue sample 44.

Figure 12:
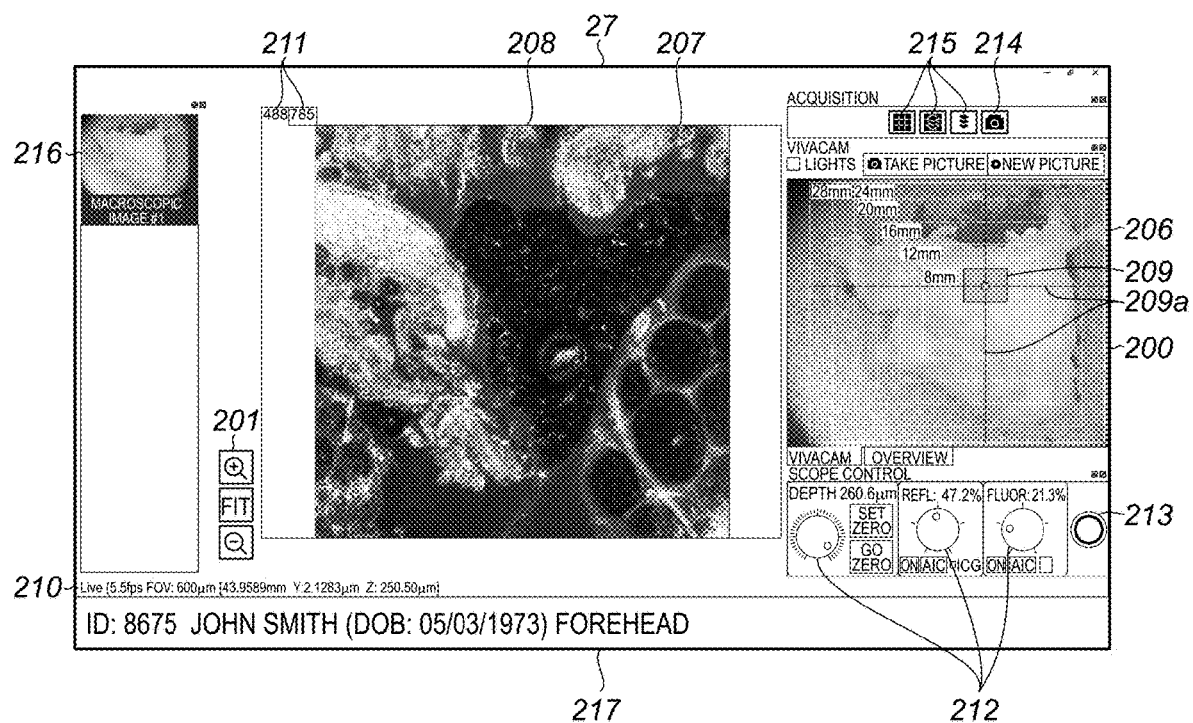
FIG. 12 is an example of the same screen of display of FIG. 10 having another window for showing microscopic images of the tissue sample of FIG. 11 captured by the microscopic imager, a macroscopic still image previously captured by the macroscopic imager of the same tissue sample, and graphical elements, such as a box and orthogonal cross-hair lines, overlaid upon such still macroscopic image showing the location and field of view of the microscopic imager relative to the tissue sample.

With cover substrate 46 placed upon the substrate 42, the tissue sample 44 now verified as being substantially flush or planar upon surface 45*a*, and index matching fluid in placed on the upper tip of objective lens 72 which will face bottom surface 45*b* of substrate 42, computer system 22, responsive to the user clicking on button 213 using mouse 29, sends signals to x and y motors of stage 18 to move tissue specimen mounting platform 20 to the stored start x and y position (as shown in FIGS. 2C and 11) stored in memory of computer system 22 for the microscopic imager 16 and activates imager 16, with objective lens 72 moved to its start z position. The cross-sectional view of FIG. 4 illustrates an example of the tissue sample 44 retained in carrier 49 upon tissue specimen mounting platform 20 at a position during such movement from imager 14 to imager 16. As shown in FIG. 12, with stage 18 having now positioned tissue sample 44 in view of objective lens 72 of microscopic imager 16, microscopic images 207 are captured by microscopic imager 16 and shown by computer system 22 as video in a window 208 on screen 27 of display 23 from returned light received by such one of detectors 249 and 253 providing reflectance microscopic images at 785 nm wavelength (as indicated by tab 211). The still macroscopic image 206 in window 200 has overlaid shaded box 209 showing the field of view of the microscopic imager 16 with respect to the tissue sample 44 for guiding or mapping to the user the current location with respect to the surface of the tissue sample 44 facing substrate 42 where microscopic images are being acquired. Other graphical elements, such as cross-hair lines 209*a* are also overlaid parallel with the x and y axes of the stage 18 on the selected still macroscopic image 206. Other graphical indicator element(s) of imager 16 position than box 209 may also be used. The current x, y and z positions 210 of the objective lens 72 are shown on the screen 27, where depth along the z axis is calculated at or approximate from surface 45*a* into the tissue sample 44 from the start position, and x and y position changes with movement of stage 18. In this manner, the macroscopic image in window 200 enables the user to guide the microscopic imager 16 to one or more selected locations for capture of one or more microscopic images of the tissue sample 44. Each microscopic image when captured is stored with location information relative to x and y coordinates in relation to the macroscopic image 206.

Controls for microscopic imager 16 may be provided as graphical knobs 212 selectable using mouse 29 to adjust depth by moving objective lens 72 along its optical axis 73 towards or away from the substrate 42, or to turn on and off reflectance (785 nm) and fluorescent (488 nm) detection.

Reflectance (785 nm) and fluorescent (488 nm) detection being set in accordance with the particular filter or opening along filter wheels 248 and 252 in path of beam to their respective detectors 249 and 253 when computer system 22 activates imager 16. The microscopic images captured at such two different laser wavelength 488 nm and 785 nm are selectable in window 208 by using mouse 29 to select different ones of tabs 211 labelled by wavelength, while the microscopic imager 16 may be turned on or off by selecting button 213 with mouse 29. Buttons 201 may similarly be used to electronically zoom microscopic image 207 as desired by the user. A still microscopic image of one of the microscopic images 207 can be captured and stored in memory of computer system 22 by selecting a button 214, while different layouts of automatic image capture can be selected by one of three buttons 215. Such selection of different locations along a tissue sample 44 with automatic capture of microscopic image(s) may be performed automatically by computer system 22 sending signals to the x and/or y motors of stage 18 to enable movement along x and/or y axes, and/or movement of objective lens 72 along its optical axis 73. Captured microscopic images stored in memory of computer system 22 using buttons 214 and 215 are displayed in a vertical stack along window 216. Selection of a different x and y location along the tissue sample 44 may optionally be selected by the user using joystick 30, keyboard 28, or by placement of a cursor and clicking using mouse 29 on a location on the tissue sample 44 shown in still macroscopic image 206 of window 200. When a different x and y location is selected, computer system 22 in response moves the stage's x and/or y motors accordingly. Further, the images in windows 200 and 208 can be switched by the user as desired by the user clicking with mouse 29 in the area within window 208. The microscopic images 207 displayed and/or stored in memory of computer system 22 can be used for pathological examination of tissue sample 44, such as performed in Mohs micrographic surgery.

Other graphical user interfaces than shown in FIGS. 8, 10 and 12 may be provided to display images captured by imagers 14 and 16. Where the captured images are associated with a patient or subject, a data entry screen may be provided to start a session prior to start of capturing images from imagers 14 and 16 so that patient or subject information may entered and stored in memory of computer system in association with images captured using buttons 202, 214, and 215. All or part of such entered information may be displayed along window 217.

As described above, system 10 uses macroscopic images from macroscopic imager 14 for verification of the tissue sample orientation assuring that the ex-vivo tissue sample 44 is properly oriented for imaging by microscopic imager 16, and if needed manipulated to a proper orientation against substrate 44 before the tissue sample is imaged by the microscopic imager 16. Also, the still macroscopic image 206 captured is used as a guide or map image of the tissue sample 44 as the tissue sample is moved by stage 18 with respect to the microscopic imager 16 as indicated by graphical box 209.

From the foregoing description, it will be apparent that a system and method for macroscopic and microscopic imaging ex-vivo tissue has been provided. Variations and modifications in the herein described system and method in accordance with the invention will undoubtedly suggest themselves to those skilled in the art. Accordingly, the foregoing description should be taken as illustrative and not in a limiting sense.

The invention claimed is:

1. A system for macroscopic and microscopic imaging ex-vivo tissue comprising:
  a macroscopic imager;
  a microscopic imager;
  a stage for moving a substrate having optically transparent material supporting ex-vivo tissue with respect to each of said macroscopic imager and said microscopic imager to enable said macroscopic imager to capture one or more macroscopic images, and said microscopic imager to capture one or more optically formed sectional microscopic images on or within said ex-vivo tissue, when presented to said ex-vivo tissue, via said optically transparent material of said substrate, wherein said ex-vivo tissue is separately imageable by each of said microscopic imager and said macroscopic imager as a result of movement of said stage, and said macroscopic imager and said microscopic imager each operate using a different detector in imaging said ex-vivo tissue;
  a computer system for controlling movement of said stage with respect to said macroscopic imager and said microscopic imager, and receiving said one or more macroscopic images, and said one or more microscopic images;
  a display for displaying said one or more macroscopic images and said one or more microscopic images when received by said computer system; and
  a housing containing at least said macroscopic imager, said microscopic imager, and said stage.

2. The system according to claim 1 wherein each of said macroscopic imager and said microscopic imager are in a different assembly fixed in position in said housing with respect to said stage prior to said ex-vivo tissue being presented to said macroscopic imager and said microscopic imager.

3. The system according to claim 1 wherein said stage moves said substrate along x and y orthogonal axes, said one or more macroscopic images and said one or more microscopic images are each two-dimensional images spatially aligned with said x and y orthogonal axes, and optics of said macroscopic imager for imaging said ex-vivo tissue, and at least an objective lens of optics of said microscopic imager for imaging said ex-vivo tissue, each have an optical axis oriented to extend at least approximately parallel with a z axis orthogonal to said x and y orthogonal axes.

4. The system according to claim 3 wherein said objective lens is movable along the optical axis of the microscopic imager to adjust depth of said one or more microscopic images within said ex-vivo tissue.

5. The system according to claim 1 wherein said one or more of said macroscopic images of said ex-vivo tissue are captured before capture of said one or more microscopic images, and said one or more macroscopic images of said ex-vivo tissue enable verification said ex-vivo tissue lies at least substantially flush against a surface of said substrate by being in focus in said one or more macroscopic images prior to said stage positioning said ex-vivo tissue for imaging by said microscopic imager.

6. The system according to claim 5 wherein any portion of said ex-vivo tissue unfocused in said one or more macroscopic images on said display is manually positioned substantially flush against said surface of said substrate until being in focus in said one or more macroscopic images captured prior to said stage positioning said ex-vivo tissue for imaging by said microscopic imager.

7. The system according to claim 5 wherein said computer system processes one or more of said macroscopic images to determine presence of any unfocused portion of said ex-vivo tissue, and graphically indicates said any unfocused portions on said display of said one or more macroscopic images.

8. The system according to claim 1 wherein said stage moves said substrate along x and y orthogonal axes, said detector of said microscopic imager represents one or more detectors, and said microscopic imager further comprises:
  a pair of mirrors oscillating along orthogonally disposed axes to provide scanning illumination of one or more wavelengths to said ex-vivo tissue via an objective lens, and to descan returned illumination from said ex-vivo tissue, via said objective lens; and
  said one or more detectors of said microscopic imager each receives said descanned returned illumination, via a pinhole, representative of said one or more microscopic images, and said microscopic imager being in an assembly adjustably mounted with respect to said housing to enable alignment of said axes of said oscillating mirrors parallel to said x and y orthogonal axes using other images captured by said microscopic imager on said display of a target positioned on said stage in place of said substrate.

9. The system according to claim 1 further comprising a member or another one of said substrate for applying downward pressure onto said ex-vivo tissue against said substrate when said one or more microscopic images are captured.

10. The system according to claim 1 wherein said housing has a cover for blocking ambient light when at least said one or more microscopic images are captured by said microscopic imager.

11. The system according to claim 1 wherein one of said one or more macroscopic images is displayed on said display with display of said one or one or more microscopic images, and one or more graphical elements are overlaid upon said one of said one or more macroscopic images indicating at least a location of imaging by said microscopic imager with respect to said ex-vivo tissue displayed in said one of said one or more macroscopic images to guide in selection of one or more locations along said ex-vivo tissue for imaging by said microscopic imager.

12. The system according to claim 1 wherein said macroscopic imager comprises optics which focus light from said ex-vivo tissue at or near a surface of said substrate supporting said ex-vivo tissue to said detector of said macroscopic imager, and light sources for illuminating said ex-vivo tissue when said one or more macroscopic images are captured by said macroscopic imager.

13. The system according to claim 12 wherein said macroscopic imager is an assembly adjustably mounted with respect to said housing to enable alignment of said focus of said optics of said macroscopic imager at or near a surface of said substrate supporting said ex-vivo tissue using other images captured by said macroscopic imager on said display of a target positioned on said stage in place of said substrate.

14. The system according to claim 1 wherein said microscopic imager is operative by confocal microscopy.

15. The system according to claim 1 wherein said microscopic imager is operated to capture one or more of said one or more microscopic images at one or more locations along said ex-vivo tissue selected in one of said one or more macroscopic images on said display.

16. The system according to claim 1 wherein said detector of said microscopic imager represents one or more detectors each operated to enable capture of said one or more optically formed sectional microscopic images.

17. The system according to claim 1 wherein said detector of said macroscopic imager comprises an array of sensing elements enabling capture of said one or more macroscopic images.

18. A method for macroscopic and microscopic imaging ex-vivo tissue comprising the steps of:
mounting in a common housing at least a macroscopic imager, a microscopic imager, and a stage;
placing ex-vivo tissue on a substrate having optically transparent material;
mounting said substrate on said stage, which is mounted in said housing to move said substrate with respect to each of said macroscopic imager and said microscopic imager;
moving said stage to present said ex-vivo tissue on said substrate to said macroscopic imager;
capturing, with said macroscopic imager, one or more macroscopic images via said optically transparent material of said substrate;
moving said stage to present said ex-vivo tissue to said microscopic imager;
capturing, with said microscopic imager, one or more optically formed sectional microscopic images on or within said ex-vivo tissue via said optically transparent material of said substrate, wherein said step of capturing one or more macroscopic images and said step of capturing one or more microscopic images are each carried out using a different detector;
displaying said one or more macroscopic images and said one or more microscopic images when captured with the aid of a computer system receiving said one or more macroscopic images and said one or more microscopic images; and
wherein said step of moving said stage to present said ex-vivo tissue to said microscopic imager further comprises:
moving said ex-vivo tissue from being presented to said macroscopic imager to being presented to said microscopic imager in order that said step of capturing said one or more microscopic images can be carried out by said microscopic imager.

19. The method according to claim 18 wherein said step of capturing said one or more macroscopic images further comprising the step of verifying said ex-vivo tissue lies at least substantially flush against a surface of said substrate by being in focus in said one or more macroscopic images.

20. The method according to claim 19 wherein said step of capturing one or more macroscopic images further comprises manually positioning any portion of said ex-vivo tissue unfocused in said one or more macroscopic images on said display at said verifying step substantially flush against said surface of said substrate until being in focus in said one or more macroscopic images.

21. The method according to claim 20 further comprising the step of placing a member or another one of said substrate for applying downward pressure onto said ex-vivo tissue against said substrate after said steps of capturing one or more macroscopic images and verifying are carried out, and before said step of capturing one or more microscopic images.

22. The method according to claim 18 further comprising the step of positioning a cover with respect to said housing for blocking ambient light when at least said step of capturing one or more microscopic images is carried out.

23. The method according to claim 18 wherein said step of capturing one or more macroscopic images further comprises the step of selecting one of said one or more microscopic images captured, and said displaying step displays said selected one of said one or more microscopic images with display of said one or more microscopic images when captured, and overlays one or more graphical elements on said selected one of said one or more macroscopic images indicating a location of imaging by said microscopic imager with respect to said ex-vivo tissue displayed in said selected one of said one or more macroscopic images to guide in selection of one or more locations along said ex-vivo tissue for imaging by said microscopic imager.

24. An apparatus for imaging tissue comprising:
a macroscopic imager;
a microscopic imager;
a stage for moving tissue with respect to each of said macroscopic imager and said microscopic imager to enable said macroscopic imager to capture one or more macroscopic images and said microscopic imager to capture one or more optically formed sectional microscopic images on or within said tissue, when presented to said tissue, wherein said tissue is separately imageable by each of said microscopic imager and said macroscopic imager as a result of movement of said stage;
a computer system for controlling movement of said stage with respect to said macroscopic imager and said microscopic imager, and receiving said one or more macroscopic images, and said one or more microscopic images; and
a display for displaying said one or more macroscopic images and said one or more microscopic images when received by said computer system, wherein said macroscopic imager and said microscopic imager each operate using a different detector in imaging said tissue.

25. The apparatus according to claim 24 wherein said detector of said microscopic imager represents one or more detectors each operated to enable capture of said one or more optically formed sectional microscopic images.

26. The apparatus according to claim 24 wherein said detector of said macroscopic imager comprises an array of sensing elements enabling capture of said one or more macroscopic images.

27. A system for macroscopic and microscopic imaging ex-vivo tissue comprising:
a macroscopic imager;
a microscopic imager;
a stage for moving a substrate having optically transparent material supporting ex-vivo tissue with respect to each of said macroscopic imager and said microscopic imager to enable said macroscopic imager to capture one or more macroscopic images, and said microscopic imager to capture one or more optically formed sectional microscopic images on or within said ex-vivo tissue, when presented to said ex-vivo tissue, via said optically transparent material of said substrate, wherein said macroscopic imager and said microscopic imager each operate using a different detector in imaging said ex-vivo tissue;
a computer system for controlling movement of said stage with respect to said macroscopic imager and said microscopic imager, and receiving said one or more macroscopic images, and said one or more microscopic images;

a display for displaying said one or more macroscopic images and said one or more microscopic images when received by said computer system; and a housing containing at least said macroscopic imager, said microscopic imager, and said stage;

wherein said detector of said macroscopic imager comprises an array of sensing elements for capturing light received via optics of said macroscopic imager, and said macroscopic imager further comprises:

a circular symmetric parabolic reflector having a central opening through which said optics of said macroscopic imager extends upwards;

a conical wall truncated at the lower end thereof, said conical wall having a central aperture disposed along said central opening, and an exterior reflective surface extending upwards from said lower end with an increasing diameter; and a plurality of LEDs in a ring at the base of said reflector in which said LEDs are disposed under said conical wall, and said ring of LEDs are operated to illuminate said ex-vivo tissue, via a gap between said parabolic reflector and said exterior reflective surface, when said one or more macroscopic images are captured by said macroscopic imager via said optics of said macroscopic imager and said central aperture.

* * * * *